US006487322B1

(12) United States Patent
Bastos et al.

(10) Patent No.: US 6,487,322 B1
(45) Date of Patent: Nov. 26, 2002

(54) GENERATING IMAGE DATA

(75) Inventors: Rui Bastos, Porto Alegre (BR); Filippo Tampieri, Montreal (CA)

(73) Assignee: Autodesk Canada Inc., Quebec (CA)

( * ) Notice: Subject to any disclaimer, the term of this patent is extended or adjusted under 35 U.S.C. 154(b) by 0 days.

(21) Appl. No.: 09/261,146

(22) Filed: Mar. 3, 1999

(51) Int. Cl.$^7$ .............................................. H04N 1/40
(52) U.S. Cl. ...................................... 382/274; 382/276
(58) Field of Search ................................ 382/274, 276, 382/254; 345/582–588; 358/1.9

(56) References Cited

U.S. PATENT DOCUMENTS

| | | | | |
|---|---|---|---|---|
| 4,928,250 A | | 5/1990 | Greenberg et al. ........... | 364/518 |
| 5,175,808 A | | 12/1992 | Sayre .......................... | 395/133 |
| 5,313,568 A | | 5/1994 | Wallace et al. .............. | 395/126 |
| 5,459,492 A | * | 10/1995 | Vadlamannati ............... | 347/253 |
| 5,484,275 A | * | 1/1996 | Mical et al. .................. | 345/698 |
| 5,488,700 A | | 1/1996 | Glassner ...................... | 395/126 |
| 5,579,455 A | | 11/1996 | Greene et al. ............... | 395/122 |
| 5,650,858 A | * | 7/1997 | Lund ............................. | 347/5 |
| 5,734,385 A | | 3/1998 | Mima ........................... | 345/426 |
| 5,808,620 A | | 9/1998 | Doi et al. .................... | 345/426 |
| 5,894,309 A | | 4/1999 | Freeman et al. ............. | 345/426 |
| 5,909,087 A | | 6/1999 | Bryde et al. ................. | 315/149 |
| 5,914,721 A | | 6/1999 | Lim ............................. | 345/421 |
| 5,936,633 A | | 8/1999 | Aono et al. .................. | 345/432 |
| 5,978,142 A | * | 11/1999 | Blackham et al. ........... | 348/758 |
| 5,982,948 A | * | 11/1999 | Shimada et al. ............. | 358/461 |
| 6,078,332 A | | 7/2000 | Ohazama .................... | 345/426 |
| 6,084,590 A | | 7/2000 | Robotham et al. .......... | 345/429 |

OTHER PUBLICATIONS

J. Dorsey et al., "Interactive Design of Complex Time–Dependent Lighting," IEEE Comp. Graphics and Applications, 15(2):26–35, 1995.

J. Nimeroff, "Implementation and Analysis of an Image–Based . . . Environments," IEEE Trans. on Visalization and Comp. Graphics, 2(4):283–297, 1996.

D. Lischinski et al., "Discontinuity Meshing for Accurate Radiosity," Cornell Univ., IEEE Comp. Graphics and Applications, pp. 25–39, 1992.

D.W. George et al., "Radiosity Redistribution for Dynamic Environments," Cornell Univ., IEEE Comp. Graphics and Applications, pp. 26–34, 1990.

Y. Chrysanthou, "Fast Approximate Quantitative Visibility for Complex Scenes," IEEE Comp. Graphics Int'l Proceedings, pp. 220–227, 1998.

E. Pang et al., "An Efficient Implementation of Affine Transformation Using One–Dimensional FFT's," University of Toronto, Ontario, Canada MTS 3G4, IEEE Conf., 4:2885–2888, 1997.

* cited by examiner

*Primary Examiner*—Thomas D. Lee
*Assistant Examiner*—Stephen Brinich
(74) *Attorney, Agent, or Firm*—Gates & Cooper LLP

(57) ABSTRACT

A surface generated from a radiosity simulation is shaded. The surface is divided into a plurality of elements and a brightness value is calculated for each of the elements. An initial surface shading is defined in which the resolution of shading is determined in response to the highest element density of the surface. Element brightness values are processed to generate brightness values for the initial surface shading and values of the initial surface shading are filtered to generate brightness values for an enhanced surface shading. Brightness values of a plurality of elements may be combined to generate a single texel brightness value in the initial surface shading. The filtering step may include steps of increasing the resolution of the initial surface shading and filtering the increased resolution shading. A galcion filtering process may be performed.

32 Claims, 21 Drawing Sheets

Figure 5B $\quad B_i A_i = E_i A_i + R_i \sum_{j=1}^{n} B_j A_j \cdot F_{ji}$

Figure 5C $\quad F_{ij} \cdot A_i = F_{ji} \cdot A_j$

Figure 5D $\quad B_i = E_i + R_i \sum_{j=1}^{n} B_j F_{ij}$

GENERATING IMAGE DATA

FIELD OF THE INVENTION

The present invention relates to shading surface data defined in three dimensional space.

BACKGROUND TO THE INVENTION

Several procedures are known for rendering images containing elements defined as three-dimensional data. A known approach to generating images of photo-realistic quality is to consider light reflections between all objects as a system of equations, which may then be solved using an iterative process. This approach, known generally as radiosity, results in brightness values being identified for surfaces of three-dimensional objects. In order to achieve photo-realistic quality, the surfaces of objects must be subdivided into a plurality of mesh elements, from which the system of equations may then be constructed. In order to simplify calculations, and to ensure that the system of equations is not excessively large, practical implementations of the radiosity technique consider brightness as being constant across the area of each individual mesh element.

When rendering the resulting elements it is necessary to perform interpolations between brightness values, such that brightness discontinuities do not appear at element boundaries. In known systems, Gouraud shading is used with respect to brightness values identified at element vertices. In order to do this, a determination of brightness values at the vertices of elements must be determined from the constant brightnesses of neighbouring elements. The Gouraud shading performs linear interpolation of the vertex brightness and offers brightness value continuity at element boundaries. Slope continuities, or changes in brightness gradient, are not handled in Gouraud shading, resulting in severe artefacts at element boundaries where brightness gradient varies greatly over short distances.

SUMMARY OF THE INVENTION

According to a first aspect of the present invention, there is provided a method of shading a surface generated from a radiosity simulation, in which said surface has been divided into a plurality of elements, and a brightness value has been calculated for each of said elements, including the steps of defining an initial surface shading in which the resolution of shading is determined in response to the highest element density of said surface; processing element brightness values to generate brightness values for said initial surface shading; and filtering values of said initial surface shading to generate brightness values for an enhanced surface shading.

In a preferred embodiment, the resolution of the initial surface shading is equal to the density of one pixel per element vertex at the region of greatest element density within said surface generated from the radiosity simulation.

Preferably, the step of processing element brightness values includes combining the brightness of a plurality of elements to generate a single texel brightness value in said initial surface shading.

According to a second aspect of the present invention, there is provided apparatus for shading a surface generated from a radiosity simulation, including processing means and storage means including a storage area for instructions for said processing means, in which said surface has been divided into a plurality of elements, and a brightness value has been calculated for each of said elements, wherein said processing means is configurable to perform the steps of defining an initial surface shading in which the resolution of shading is determined in response to the highest element density of said surface; processing element brightness values to generate brightness values for said initial surface shading; and filtering values of said initial surface shading to generate brightness values for an enhanced surface shading.

BRIEF DESCRIPTION OF THE DRAWINGS

FIG. 5B summarises light energy transfer between a single receiving surface, and an arbitrary number of emitting surfaces;

FIG. 5C shows the radiosity reciprocity equation;

FIG. 5D shows the classical radiosity equation;

DETAILED DESCRIPTION OF THE PREFERRED EMBODIMENTS

Figure 1:
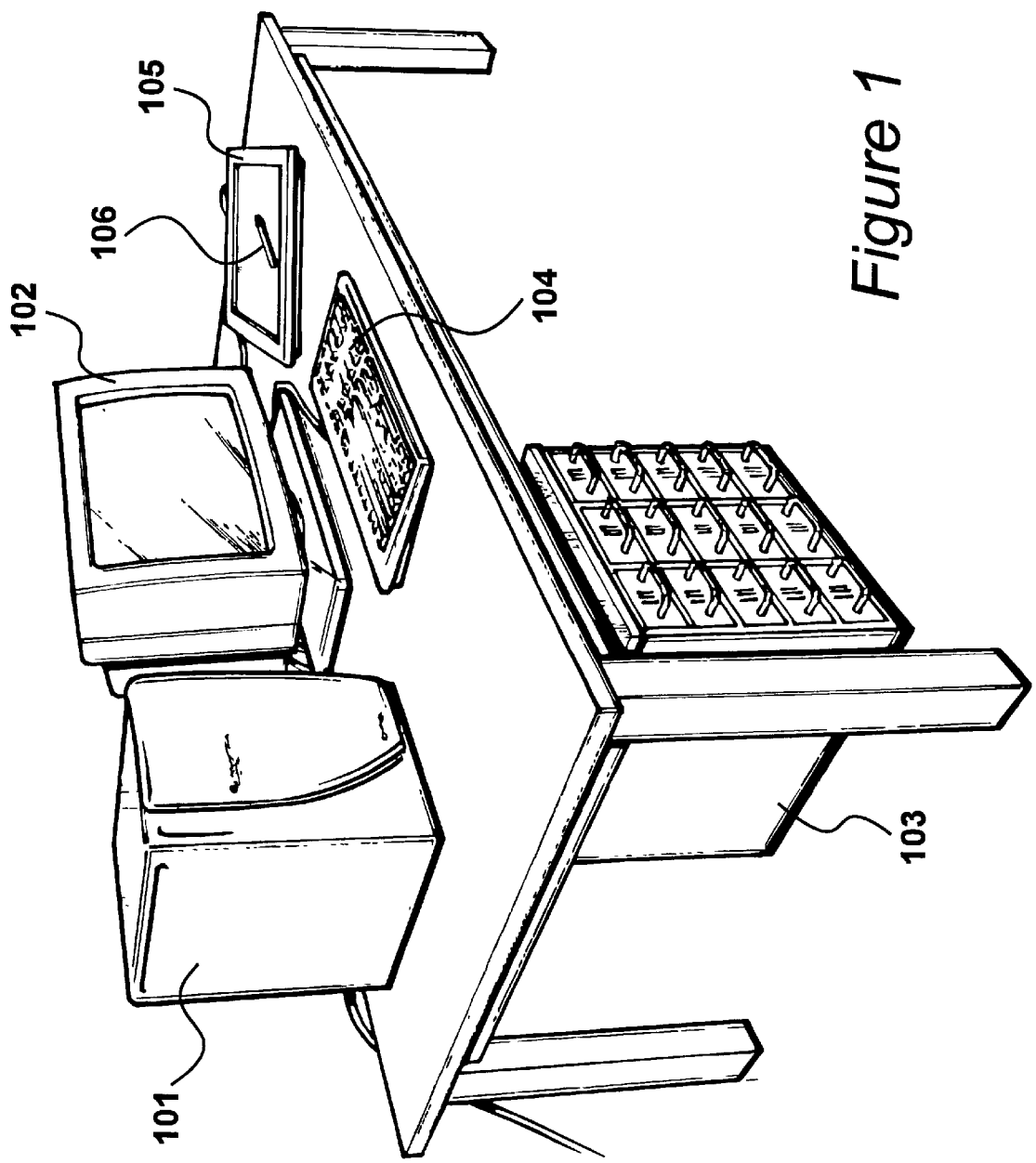
FIG. 1 shows a system for generating image data, including a monitor and a processing system.

A system for generating image data using radiosity is illustrated in FIG. 1. The radiosity process involves performing a radiosity simulation in which light emission values are calculated for all elements in the scene, irrespective of viewing position. Light emission values for elements are translated into a form suitable for subsequent rendering, and thereafter, this information is made available for particular viewing positions during radiosity rendering. The rendering process requires a sufficiently low level of computation to enable image frames of high definition and high photo-realism to be rendered with high efficiency. Radiosity reduces rendering time and also facilitates the generation of live image data, for example at video rate.

A processing system 101, such as an Octane™ produced by Silicon Graphics Inc., supplies output image signals to a video display unit 102. A user defines a scene in terms of objects in three dimensions, or by importing three-dimensional scene data from a pre-existing scene structure. The user may also determine a stationary or moving camera position from which to view the resulting rendered scene image. Rendered frames of image data, derived from three-dimensional scene data, are stored by means of a striped redundant array of inexpensive discs (RAID) 103. The system receives user commands from a keyboard 104 and a graphics tablet 105 operated by a pressure sensitive stylus 106.

Figure 2:
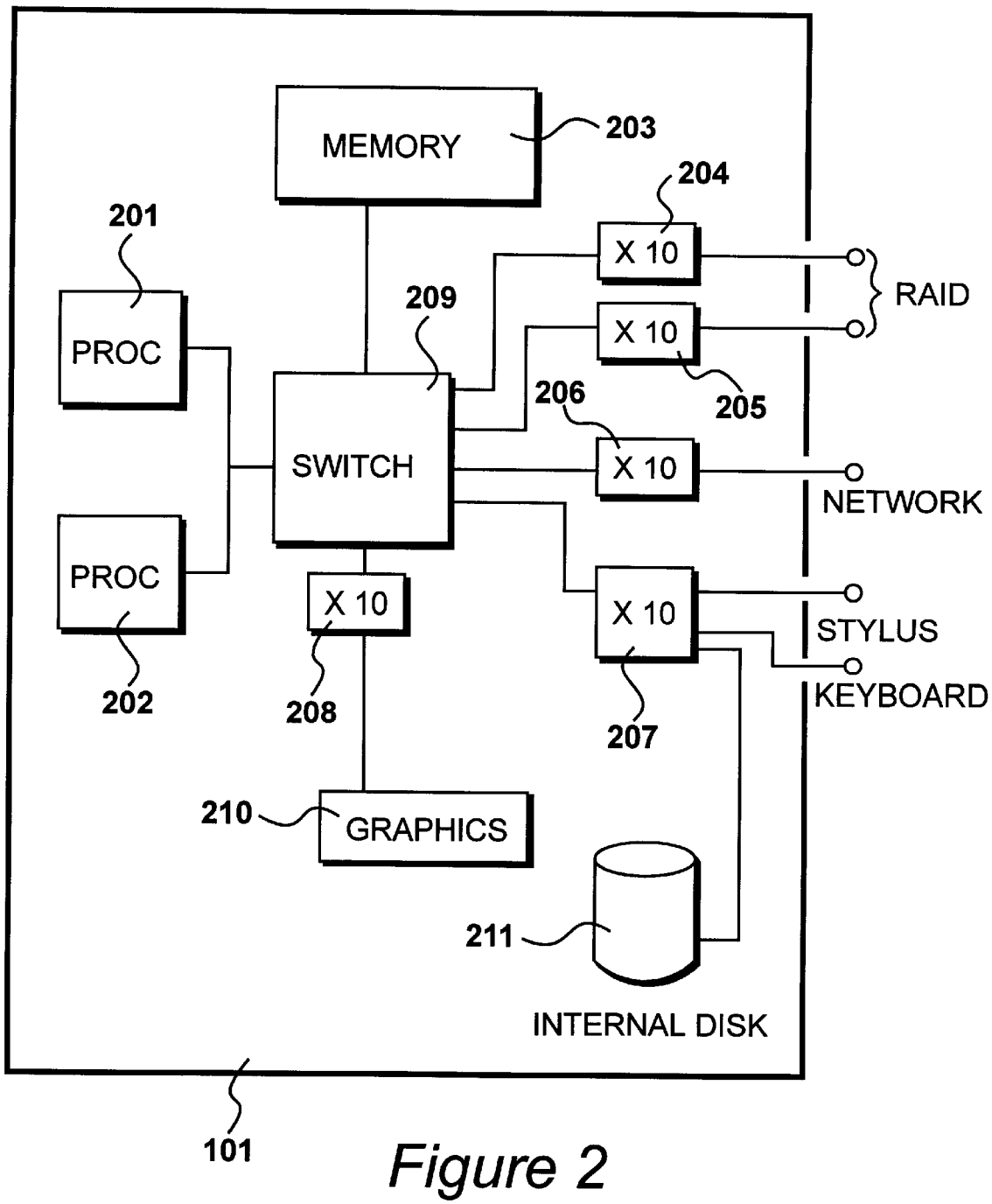
FIG. 2 details the processing system shown in FIG. 1.

The processing system 101 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the two processors 201 and 202 and with a memory 203 and other peripherals. The memory 203 includes typically two hundred and fifty-six megabytes of dynamic RAM. The memory is used to store instructions for the processors, and data, including a large quantity of element data that is required while performing the process of radiosity simulation. Input and output interface circuits are denoted as XIO in the diagram shown in FIG. 2. External connections, and connections to slow peripherals such as serial ports are made via XIO interface circuits, in order to provide synchronisation between the peripheral circuits and the extremely high speed data paths of the main processor structure.

A first XIO interface circuit 204 provides bidirectional connections to the RAID array 103 shown in FIG. 1. A second XIO interface circuit 205 provides additional connectivity to an additional RAID array, should it become necessary to increase storage requirements for image data. A third XIO interface circuit 206 provides a data connection to a network, over which three-dimensional scene data may be shared. A further XIO interface circuit 207 facilitates connection with the stylus 105 and the keyboard 104 shown in FIG. 1, in addition to an internal hard disk drive 211, four gigabytes in size, upon which instructions for the processors 201 and 202 are stored. An additional XIO interface circuit provides a connection between the cross-bar switch 209 and a graphics processor 210. The graphics processor 210 receives instructions from processors 201 and 202 in such a way as to construct a two dimensional image field for display on the video monitor 102.

Figure 3:
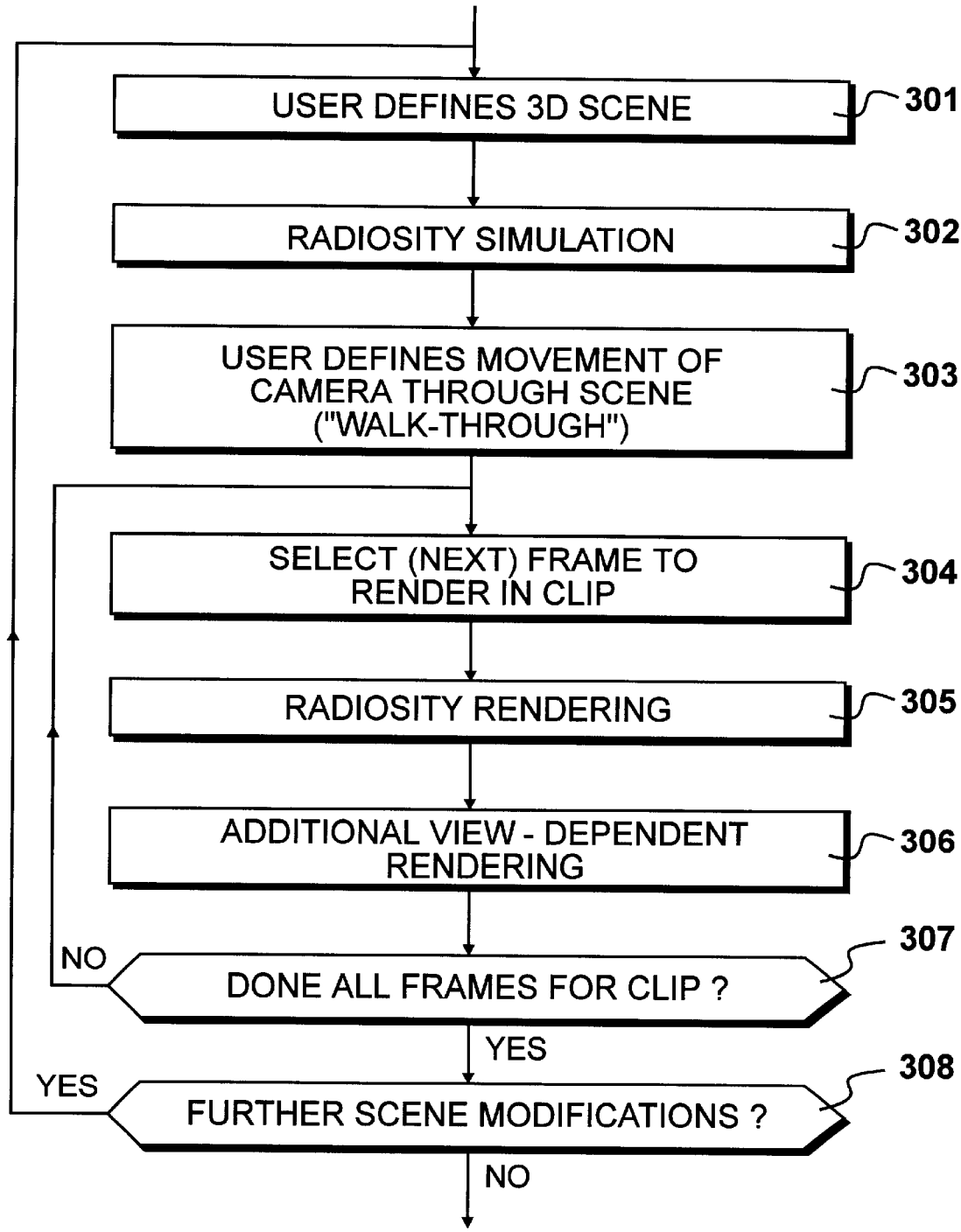
FIG. 3 details processes performed by the processing system shown in FIG. 1 when generating image data, including a process of radiosity simulation.

Procedures performed by processors 201 and 202 are illustrated in FIG. 3. At step 301 a user defines a three dimensional scene, which may involve importing three dimensional information from an external source, for example over the network connection. At step 302 a radiosity simulation is performed, configured to analyse objects within the scene so as to optimise their deconstruction into mesh elements, and then to calculate a light emission value for each mesh element.

At step 303 the user defines movement of a virtual camera through the scene, defining a changing view that is known as a "walkthrough". The same element light emission values generated by the radiosity simulation procedure 302 may be used for any desired camera view, provided that the relative positioning of objects within the scene does not change.

At step 304 a frame is selected for rendering and at step 305 radiosity rendering is performed. In radiosity rendering, the light leaving each element is projected with respect to the camera position into a two dimensional image plane. At step 306 additional view-dependent rendering is added. Radiosity generates lighting values for elements, irrespective of view. This is known as view-independent rendering. However, certain aspects of a scene may require view-dependent lighting, for example, when a mirror or other highly reflective object is present. In order to achieve photo-realism, it is then necessary to combine the radiosity rendering procedure with lighting values determined by a view-dependent procedure, such as ray tracing. Given that only a small part of the resulting image is view dependent, the additional complexity of the ray tracing procedure need not result in an excessive computational increase. Alternatively, other, less realistic view-dependent procedures may be used for speed. When combined with the high degree of realism provided by radiosity, these can still result in a highly realistic overall image being created.

At step 307 a question is asked as to whether all of the frames for the clip have been rendered. When answered in the negative, control is returned to step 304, whereupon the next frame of the clip is selected and the radiosity rendering procedure 305 is repeated. Eventually, the question asked at step 307 will be answered in the affirmative, and control will be directed to step 308. At step 308 a question is asked as to whether aspects of the existing scene need to be modified in order to improve the quality of the result. When answered in the affirmative control is returned to step 301. Eventually, no further modifications will be necessary and the question asked at step 308 will be answered in the negative.

Figure 4:
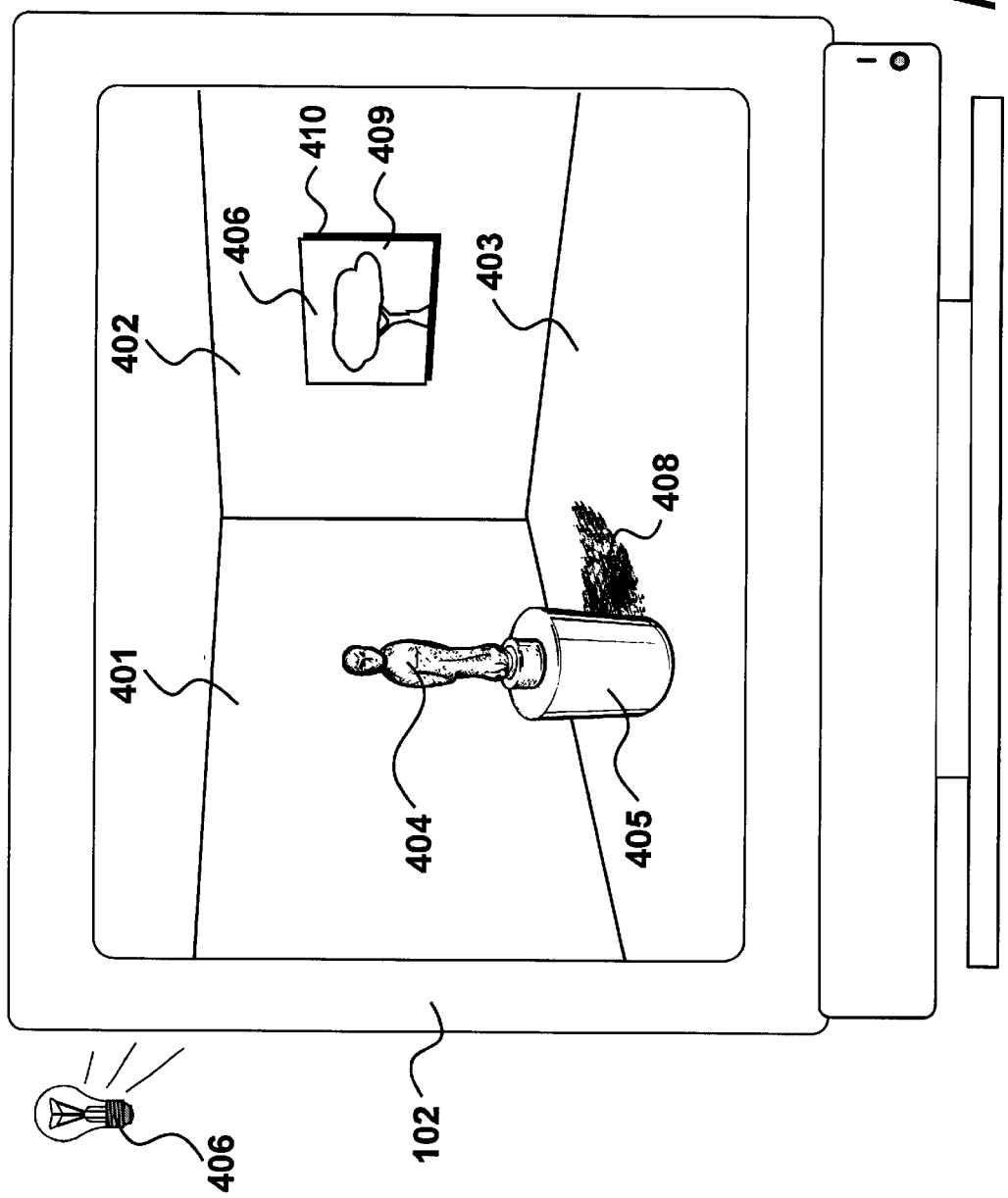
FIG. 4 details an image displayed on the monitor shown in FIG. 1, including several scene objects, that include two walls and a picture.

An example of a scene for rendering using a radiosity procedure is illustrated in FIG. 4. The scene consists of a room including a first wall 401, a second wall 402, and a floor 403. A statue 404 is located on the floor 403 and a picture 405 is shown hung on the wall 402. Radiosity simulation 302 is performed with reference to a light source, illustrated as light source 406, but which, because of the view point defined by the position of the virtual camera, does not itself appear as part of the resulting two dimensional image. The relative positioning of the light 406 and the statue 404 results in a shadow 407 being cast on floor 403. Similarly, given the position of light source 410, a frame 409 of picture 405 also casts a slight shadow 410 against the wall 402.

The presence of a light source in the scene results in a quantity of light energy being introduced. This light energy is scattered throughout the scene in a complex way, that is dependent upon the reflectivities, shapes and positioning of objects within the scene. Radiosity simulation constructs a system of equations to represent these relationships, and is thereby able to determine lighting values that are very realistic.

Figure 5A:
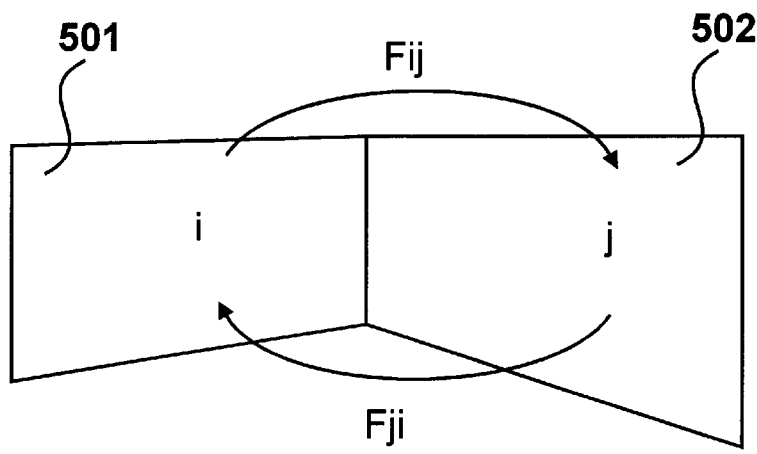
FIG. 5A summarises light energy transfer between a pair of objects, such as the two walls shown in FIG. 4.

The basic approach to performing the radiosity simulation 302 is outlined in FIGS. 5A, 5B, 5C and 5D. FIG. 5A details two elements 501 and 502 in a scene. The two elements are at right angles, such that it can be seen that not all of the light energy from element 501 will be transferred to element 502, and vice versa. The actual proportion of light energy transferred from one element to another is called the form factor. If element 501 is considered to be a source element i, and element 502 is considered to be a receiving element j, the form factor for the transfer of light energy per unit area from i to j is denoted Fij. Similarly, the proportion of energy from element j transferred to element i is denoted Fji.

It can be seen from this example that calculating the form factor requires a determination of the visibility of the source element with respect to the receiving element. This is made more complex if a third occluding element is possibly present, which may totally or partially block light transfer between the elements for which the form factor is being calculated. In the event that a scene comprises only two elements 501 and 502, and one of these is a light source, it is possible to construct a pair of simultaneous equations that may be solved in order to obtain the light emission from each element. In practice, however, a scene comprises many objects, each of which may need to be subdivided into a mesh of elements in order to obtain a sufficiently accurate representation of light variation across surfaces.

Given the form factors for all element interactions that are being considered, the total brightness from an element i is obtained by considering the sum of light energies directed at it from all of the other elements in the scene. This relationship is illustrated in FIG. 5B. The fundamentals underpinning the radiosity approach are derived from notions of conservation of energy and the total light energy flux emitted by a particular element is therefore considered as the product between a flux density value B and the area of the element A, identified as the product BA. Thus, for a particular element i, the energy flux radiated by this element is identified as the product BiAi which is then considered as equal to the self emission of the element Ei multiplied again by its area Ai plus the sum of all light received from all of the co-operating elements. Thus, for every single co-operating element in the scene, each instance of which is denoted by the letter j, the amount of light received by element i is equal to the flux density Bj of element j multiplied by the area Aj of element j multiplied by the form factor Fji expressing the proportion of light transferred from j to i. The sum of these values is then multiplied by the reflectance Ri representing the reflectance of element i.

As previously stated, the procedure is underpinned by notions of conservation of energy. Therefore, in accordance with this principle, the form factor Fij for the transfer of light energy from i to j, multiplied by the area Ai of element i is equal to the form factor Fji representing the transfer of light energy from j to i multiplied by the area Aj of j, as shown in FIG. 5C. This is known as the radiosity reciprocity equation. This relationship may be substituted into the equation of FIG. 5B to give the equation shown in FIG. 5D, which is known as the classical radiosity equation. In FIG. 5D, the flux density Bi of element i is given by the source flux density Ei of element i plus the reflectance Ri multiplied by the sum for each element j, of flux density Bj multiplied by the form factor Fij.

The equation shown in FIG. 5D is the one used to determine lighting values for elements in a scene. In a simplistic approach, in a scene containing fifty thousand elements, the right hand side of this equation would have to be evaluated fifty thousand times in order to obtain an initial illumination value for a single element i. Thus, in order to calculate an initial illumination value for all fifty thousand elements, the right side of this equation must be evaluated fifty thousand times fifty thousand times. Furthermore, this large number is also the number of form factors that need to be calculated before the system of equations can be solved. Thus a radiosity simulation utilising this approach is impractical for realistic image synthesis of scenes containing large numbers of elements.

Figure 6:
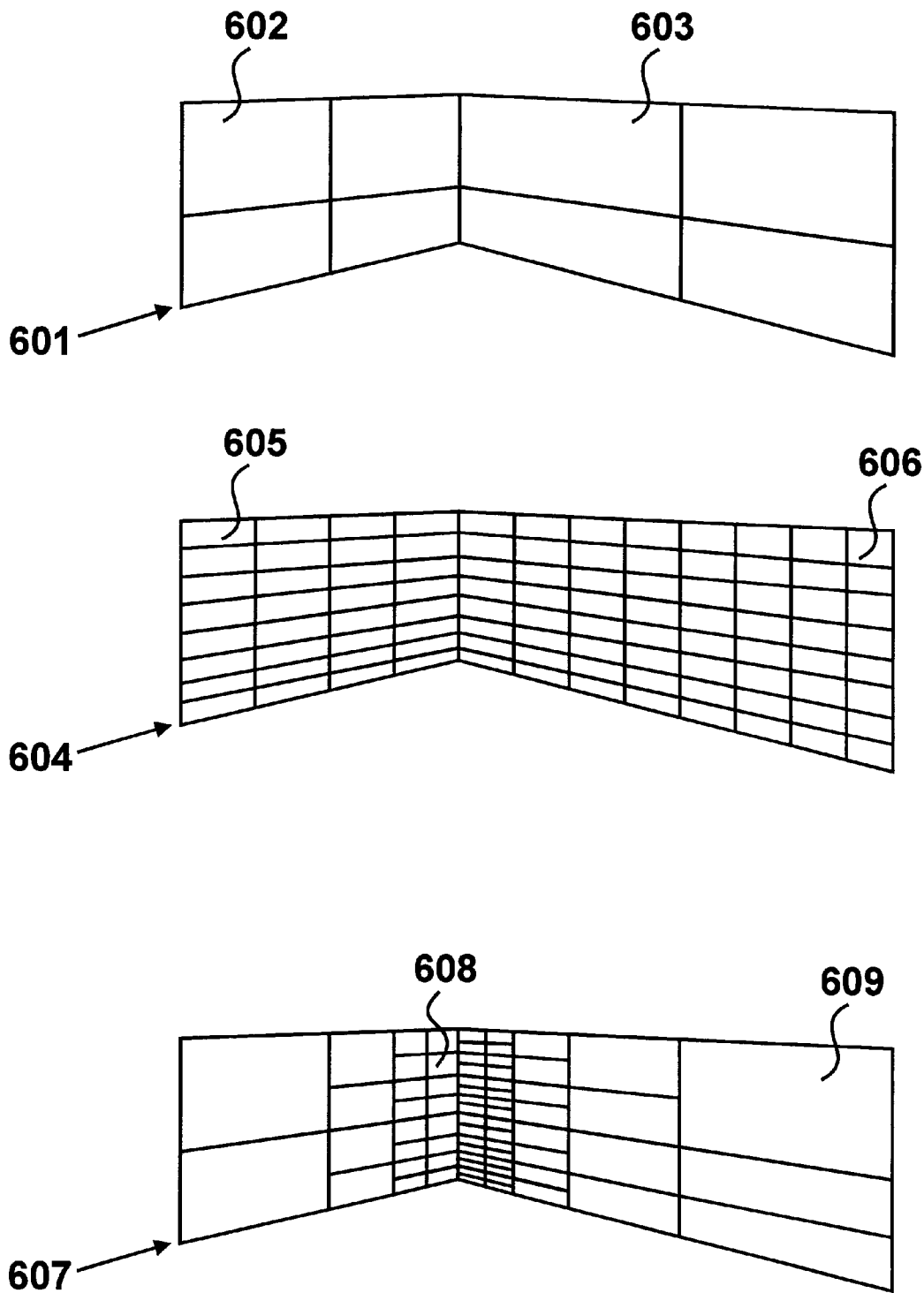
FIG. 6 indicates meshing strategies for the walls shown in FIG. 4.

A solution in which a relatively low number of elements are present is illustrated at 601 in FIG. 6. The image consists of two walls, in which the first wall has been subdivided into four mesh elements 602 and a second wall has also been subdivided into four mesh elements 603. The total number of elements present is relatively small, thereby reducing computational time when evaluating the equation in FIG. 5D, but this in turn results in a coarse image having visible artefacts. This problem may be understood by considering that, although illumination throughout the scene is non-linear, the illumination gradient where the walls meet changes faster than in the middle of a wall. Thus, by rendering the scene at the level of resolution shown at 601, the shading close to the intersection of the walls will be unrealistic.

A solution to this problem is shown at 604. In this example, the walls are the same as those identified at 601 but each wall has been divided into substantially more mesh elements. Thus, a first wall is made up of sixty-four elements 605 with a similar sixty-four element mesh 606 being present in the second wall. This results in a significant improvement of the overall realism of the image but a major increase in terms of computational overhead. It can be seen that the complexity of solving the equation in FIG. 5D increases in proportion to the square of the number of elements present, when this approach is used. Furthermore, it may be understood that while the level of meshing has been increased where this is important, close to the intersection of the walls, it has also been increased unnecessarily in other areas.

Computational time may be reduced while maintaining image quality by taking a hierarchical approach as illustrated at 607. In this example, the walls have been divided into a large number of small elements, such as element 608, at positions where the interaction between the walls is greatest. Similarly, at a distance displaced from the intersection, the elements, such as element 609, are significantly larger. In this way, good image quality is obtained while computational overhead is reduced. This type of meshing is further enhanced by only evaluating form factors between mesh elements at an appropriate level of resolution. For example, a large mesh element at the edge of a wall need not evaluate multiple form factors for interactions between all the small mesh elements on the wall opposite that are close to the intersection. Instead, an appropriate coarse superset of the smallest mesh elements is selected for this interaction. Thus it becomes possible to consider the mesh as a nested hierarchy, such that, whenever possible, coarser mesh elements are used to define light exchanges. The sub-divisions of coarse mesh elements are used when the predicted accuracy of light interchange is not sufficiently high. This technique is known as hierarchical radiosity. A data structure representing the nested levels of mesh elements is known as a multi-resolution representation of the radiosity equation.

Hierarchical radiosity may still be time consuming, as there may be many thousands of objects within a scene. Thus, regardless of the efficiency of the hierarchical mesh, there are still a minimum number of interactions that are defined to be the square of the number of objects. In typical photo-realistic scenes, this number may still be prohibitively high. In order to reduce the computation still further, additional procedures have been established in order to extend hierarchical radiosity. In radiosity with clustering, certain combinations of objects, such as the statue 404 shown in FIG. 4, and its base 405, are considered as forming a single cluster element. Interactions with distant elements, such as those comprising a wall 402, may then be expressed by the use of a single form factor, because the light reaching the wall from the statue is weak. The difference between the statue as it is, and the statue represented, for example, as a single radiating cylinder, will be below the required accuracy threshold when calculating the form factor for transfer from the statue to the wall. Closer surfaces, such as wall 401, may need to consider the statue as comprising a number of elements, each having different light emission values, in order to determine local light emission gradients with sufficient accuracy. The combination of hierarchical radiosity with clustering reduces the number of element relationships from n squared to approximately n log n, where n is the number of mesh elements in the scene. It is this reduction in complexity that has enabled the radiosity technique to be considered for use in many applications.

Figure 7:
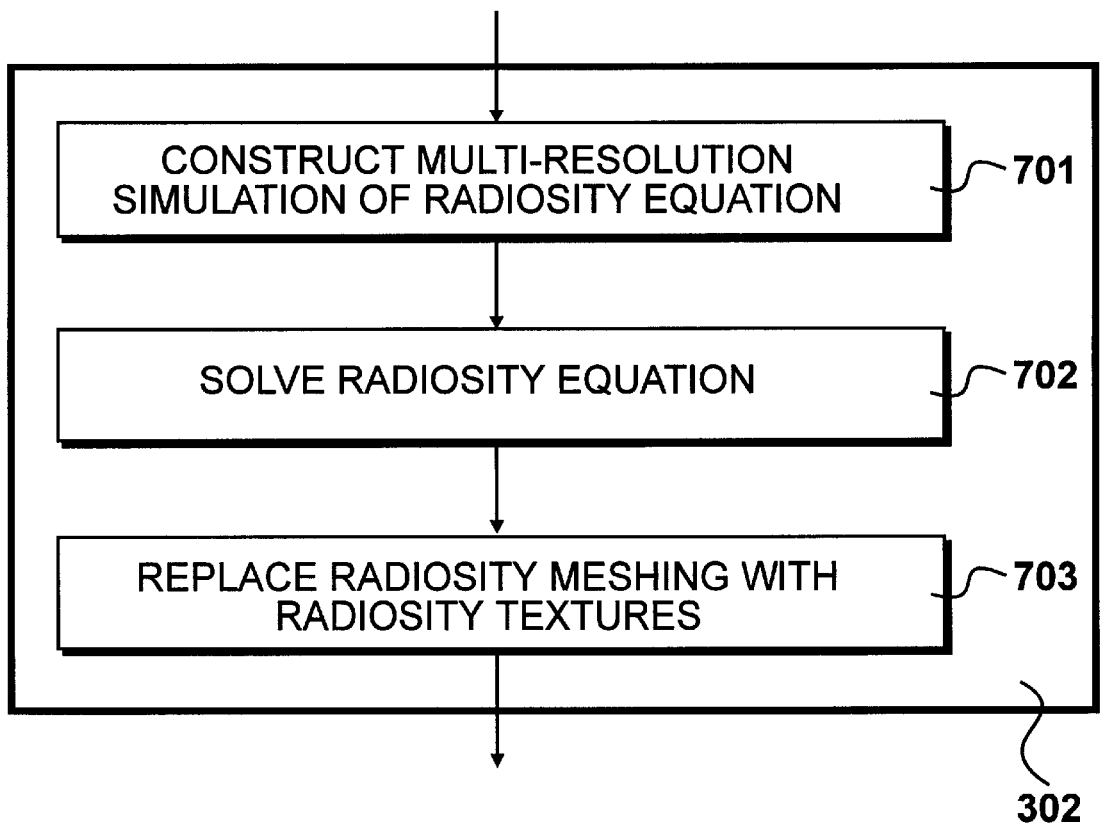
FIG. 7 details the process of radiosity simulation, shown in FIG. 3, including processes of constructing a multi-resolution representation of the radiosity equation, solving the radiosity equation, and replacing radiosity meshing with radiosity textures.

Procedure 302 for performing radiosity simulation is detailed in FIG. 7. At step 701 the multi-resolution representation of the radiosity equation is constructed. At step 702 the radiosity equation is solved. At step 703 replacement of radiosity mesh with radiosity textures is performed, in which radiosity textures for the surfaces of objects are determined in accordance with the present invention.

Figure 8:
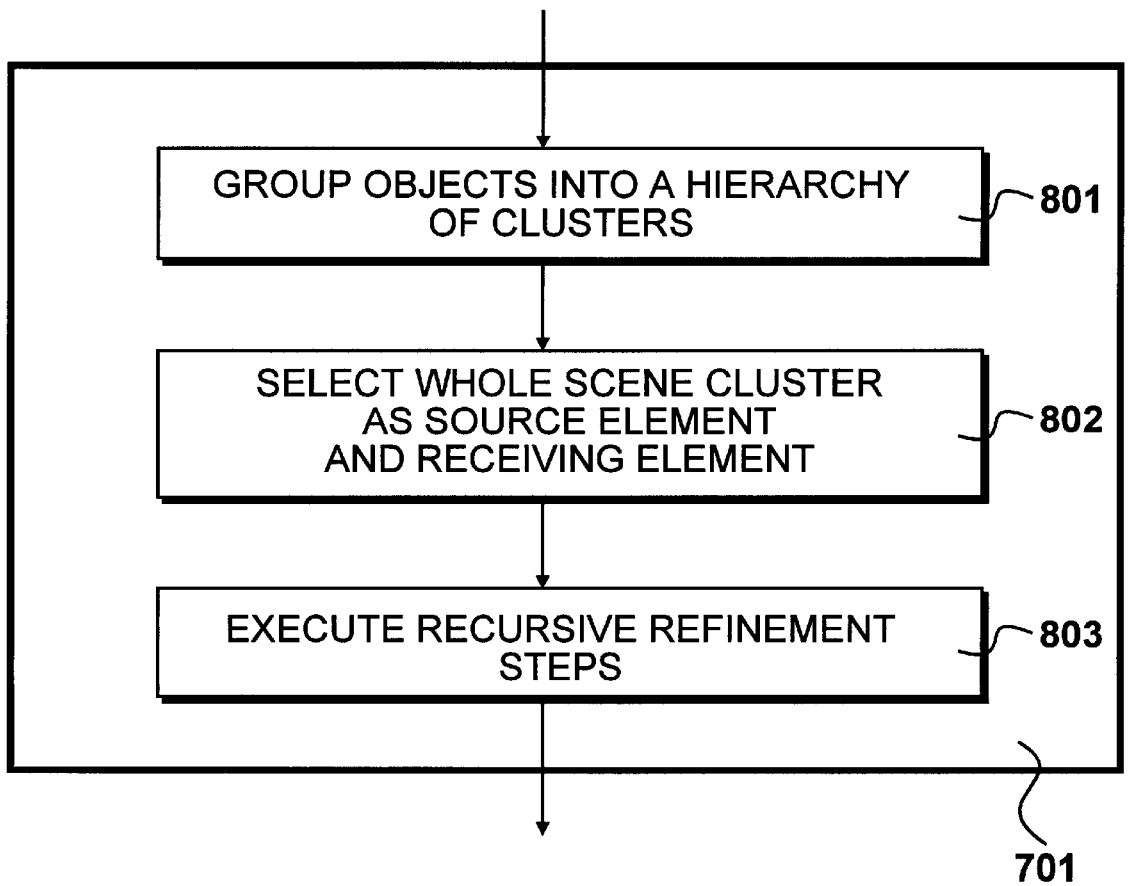
FIG. 8 details the process of constructing the multi-resolution representation of the radiosity equation shown in FIG. 7, including a process of executing refinement steps.

Procedure 701 for the construction of a multi-resolution representation of the radiosity equation is detailed in FIG. 8. At step 801 all of the scene is analysed such that a hierarchy of cluster elements is generated. At the top of this hierarchy is a cluster that represents the whole scene. Below this cluster are clusters that represent distinct groups of objects, related by their physical proximity. A method for hierarchical clustering of objects is described in "A Clustering Algorithm for Radiosity in Complex Environments", by Brian Smits, James Arvo and Donald Greenberg, Proceedings of SIGGRAPH '94, pp.435–442, 1994. The lowest level of the cluster hierarchy is the object level. Objects themselves may be considered as elements, in the same way as clusters, and the mesh elements which are created at a later stage of processing.

At step 802, the whole scene cluster at the top of the hierarchy of clusters, is selected as being both a source element and a receiving element. Thus, it is considered as transferring light onto itself. This apparently unlikely starting point is never in actual fact considered as a genuine light path. However, it serves to initiate the recursive refinement process of step 803. At step 803, the whole scene is considered initially as emitting light to itself. The recursive refinement process considers this as resulting in an excessively bad quality of light shading, and so recursively considers the component clusters and objects for light interactions. Furthermore, the recursive refinement process at step 803 creates mesh elements for the surfaces of objects wherever this is necessary in order to represent the light shading to a sufficient level of accuracy.

Figure 9:
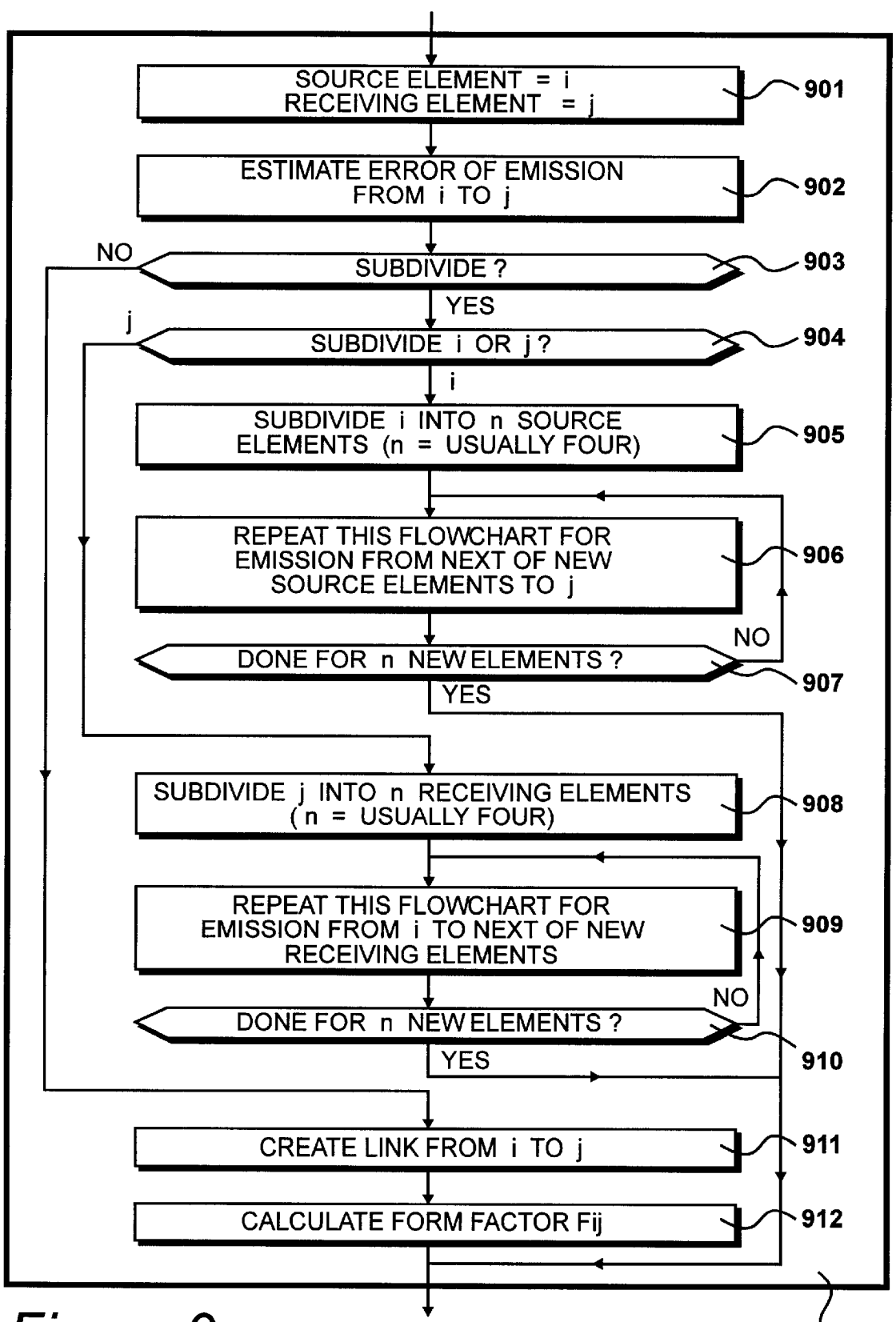
FIG. 9 details the process of executing refinement steps shown in FIG. 8.

The recursive refinement process 803 shown in FIG. 8 is detailed in FIG. 9. A source element and a receiving element will have been selected by either process 802, or subsequent steps 906 or 909 within the same flowchart. These are now initially denoted as source element i and receiving element j at step 901. At step 902 an error is determined for the transfer of light from i to j, wherein i and j are uniformly emissive. Upon initial execution of the flowchart of FIG. 9, as indicated at step 803, the source element i and the receiving element j are both the same, and are the cluster element that represents the whole scene. Inevitably, the error determined for using this light path as the sole radiosity transaction for shading the entire scene results in a very large error in the quality of surface shading. Thus, on the first execution of the process shown in FIG. 9, as represented at step 803, the predicted error generated at step 902 will be very high.

At step 903 a question is asked as to whether a subdivision into further elements is required in order to improve the quality of the simulation. If the estimated error, calculated at step 902, is considered to be sufficiently small, subdivision is not required and the question asked at step 903 is answered in the negative. The question asked at step 903 is also answered in the negative if, within the constraints of the system, it is no longer possible to facilitate subdivision into smaller elements. Alternatively, if the error value estimated at step 902 is too high, the question asked at step 903 is answered in the affirmative.

At step 904 a question is asked as to whether it is appropriate to subdivide the source element i or to subdivide the receiving element j. Again, an error estimation approach is taken and a selection is made which results in the lowest estimated error, or the predicted highest simulation quality, being produced. If a selection is made to the effect that the source element i is to be subdivided, i is subdivided into source elements at step 905. Subdivision of a cluster results in the identification of component cluster elements, and/or component object elements. If, however, the element that is being subdivided is an object, the subdivision process at step 905 may create new elements. Typically, when a mesh is being created, this will result in the element being split up into four new elements. At subsequent levels of recursions, these mesh elements may themselves be further split, into usually four new elements, and so on, until the desired level of resolution is achieved in order to attain the required level of quality.

If an assessment is made at step 904 to the effect that the receiving element j is to be subdivided, control is directed to step 908 and a subdivision of j into receiving elements, in a similar manner, is performed at step 908.

At step 906, the processes of the flowchart shown in FIG. 9, and of which step 906 is a part, are repeated, by considering each of the newly identified element subdivisions as a source element. This step is a recursive step, and when this step is performed, at the next level of recursion, it may be understood that each of the newly identified source elements is then considered in its turn as element i, as determined at step 901. On exiting the recursive step at step 906, control is directed to step 907, where a question is asked as to whether any additional newly identified elements remain to be considered as emitters. If answered in the affirmative, control is directed back to step 906, where the next newly identified element is considered. Alternatively, all new elements have been considered. This represents the exit condition for the whole of the flowchart of FIG. 9.

Similar processes are performed at steps 908, 909 and 910, where newly identified elements are considered as receiving elements. In the recursive step 909 each newly identified receiving element is considered as receiving element j at step 901 in the next level of recursion.

Subdivisions continue to be created recursively until the question asked at step 903 is answered in the negative. At this point, a specific element has been defined as an appropriate source element and an appropriate element has been defined as a suitable receiving element. At step 911 a link is created between these elements which establishes that a transfer of light is considered as being effected between these elements for the purpose of radiosity calculations. Thereafter, at step 912, a form factor Fij is calculated representing the interaction in terms of light being transferred from the source element i to the receiving element j.

After the execution of step 912 it is likely for the procedure to be within a recursive operation. Under these circumstances, emerging from step 912 is equivalent to emerging from step 906 or step 909.

Eventually, all of the elements will have been considered from the clusters at the highest level down to the smallest newly created mesh elements. This results in links and form factors being generated across a variety of levels, for example between large clusters and small elements, between clusters, and between small mesh elements. In total, this complex network of relationships defines light interactions between all surfaces in the scene, but at levels of resolution appropriate to the level of quality that is required. Thus, less links are created when a chair cluster interacts with a distant wall cluster, than if the component objects of these clusters were to be considered, in all their combinations, as an appropriate description for light energy transfer. These links, therefore, are established between appropriate levels in the hierarchy of elements, such that interactions are only considered which result in equal to or just above the required level of image quality.

Figure 10:
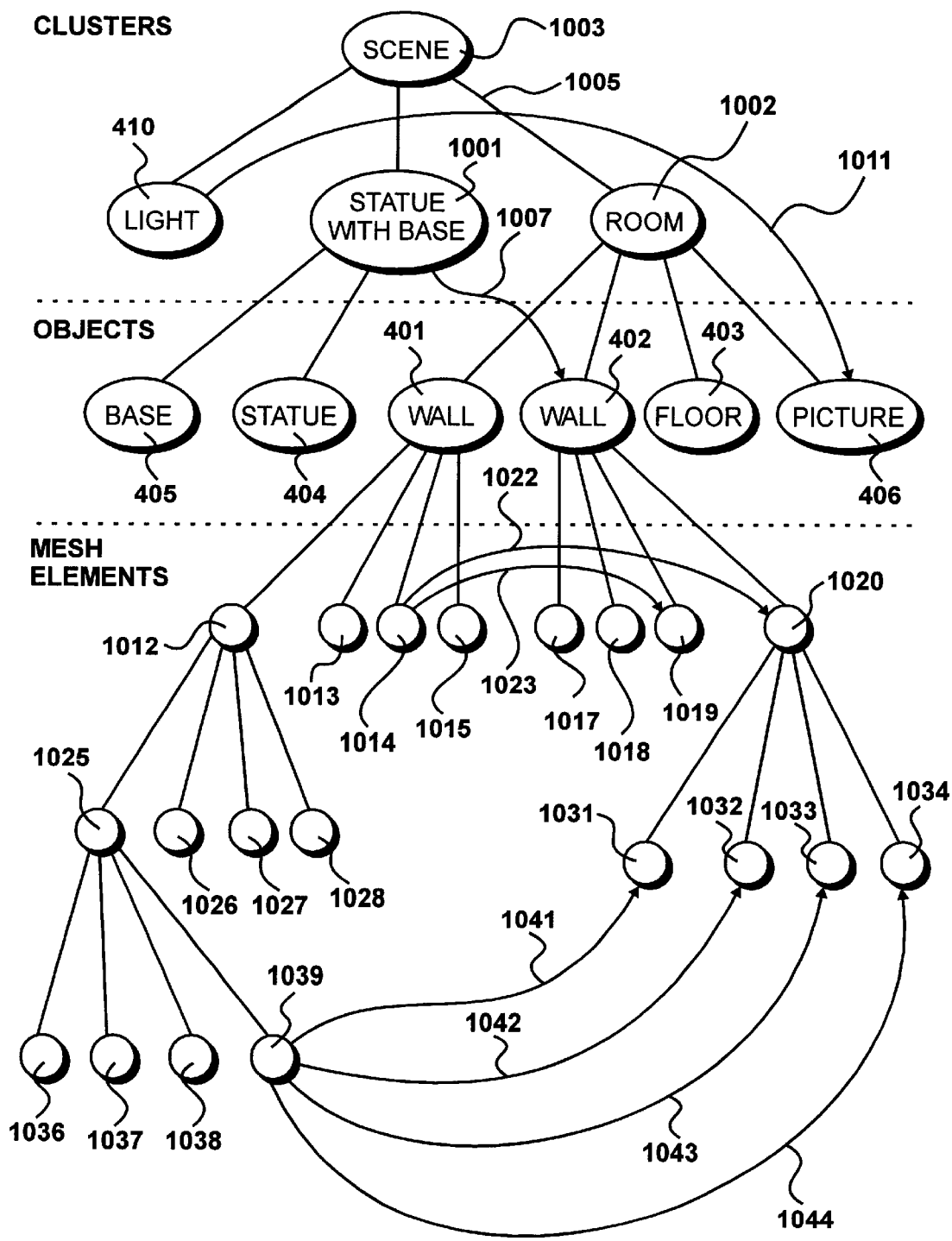
FIG. 10 illustrates data structures arising from executing the refinement process shown in FIG. 8 with respect to the objects indicated in FIG. 4.

Operations performed in accordance with the recursive procedures illustrated in FIG. 9 result in a linked structure being developed of the type represented in FIG. 10. Objects at a first level representing an object within the scene shown in FIG. 4 may be recursively subdivided into constituent elements until a level is reached at which the smallest required mesh elements are established. Objects include the statue base 405, the statue 404, the first wall 401, the second wall 402, the floor 403 and the picture 406. Within the data structure, these objects are clustered so that the base 405 and the statue 404 may be considered as a statue with base cluster 1001. Similarly, the first wall 401, the second wall 402, the floor 403 and the picture 406 are considered as a room cluster 1002. The statue with base cluster 1001 and the room cluster 1002 are then unified into a scene cluster 1003, which also includes the light source 410.

In the illustration shown in FIG. 10, straight lines, such as 1005 connecting the scene 1003 with room 1002, represent a geometric relationship between elements. Radiosity links, generated in step 911 in FIG. 9, are illustrated by curved arrowed lines, such as line 1007 illustrating an interaction between the statue and base cluster 1001 with the second wall object 402. This interaction is expressed by a form factor associated with the link that represents the amount of light transferred from the statue with base cluster 1001 to the wall 402.

The data structure illustrated in FIG. 10 does not attempt to be complete, and only shows a small fraction of the structure that would be created in order to fully represent the interactions in a typical scene such as the one shown in FIG. 4.

As an example, the recursive refinement procedure detailed in FIG. 9, will endeavour to define an interaction between the first wall 401 and the second wall 402. On this occasion, a calculated error value given at step 902 is too high for form factors to be used in terms of wall 401 transferring light to wall 402 and in terms of wall 402 reflecting light back to wall 401. Consequently, in order for the required level of quality to be achieved, it is necessary for these walls to be recursively divided into smaller elements and for the interactions to be defined in terms of appropriate element levels in preference to the interaction directly between the wall objects. The wall 401 has been subdivided into four mesh elements 1012, 1013, 1014 and 1015. Similarly, wall object 402 has been subdivided into mesh elements 1017, 1018, 1019 and 1020.

Link 1022 shows that it is possible to calculate a valid form factor with element 1014 being a source element and element 1020 being a receiving element. Similarly, link 1023 shows that it is possible to calculate a valid form factor with element 1014 as a source element and element 1019 as a receiving element. However, the required level of quality cannot be achieved if form factors are established for element 1012 as a source element and element 1020 as a receiving element. In order to generate appropriate calculations with respect to this portion of the scene, it is necessary to further recursively subdivide these elements.

Thus, when considered as a source element, element 1012 is subdivided into four elements 1025, 1026, 1027 and 1028. Similarly, as a receiving element, element 1020 is further subdivided into elements 1031, 1032, 1033 and 1034. However, further recursion has indicated that element 1025 requires further subdivision, resulting in the generation of mesh elements 1036, 1037, 1038 and 1039. At this level, it is now possible to make progress and it has been established that a form factor can be calculated with element 1039 as a source element and element 1031 as a receiving element illustrated by link 1041. Similarly, link 1042 shows that element 1039 may be a source element and element 1032 may be a receiving element. Further recursion on the receiving side is not required and element 1020 is fully satisfied as a receiving element in relation to element 1039 by links 1043 and 1044 connecting to elements 1033 and 1034 respectively.

The relationship with mesh element 1039 and elements 1031 to 1034 shows that the recursive refinement steps of FIG. 9 have been performed to a sufficient depth in order to provide the level of quality required.

FIG. 10 presents a graphical illustration of the type of data structure that is used for the multi-resolution representation of the radiosity equation. It will be understood that a true representation for a typical scene containing many thousands of objects would be impossible to present in the form of an illustration, and FIG. 10 is intended purely as an indication of data structures that are being used.

Figure 11:
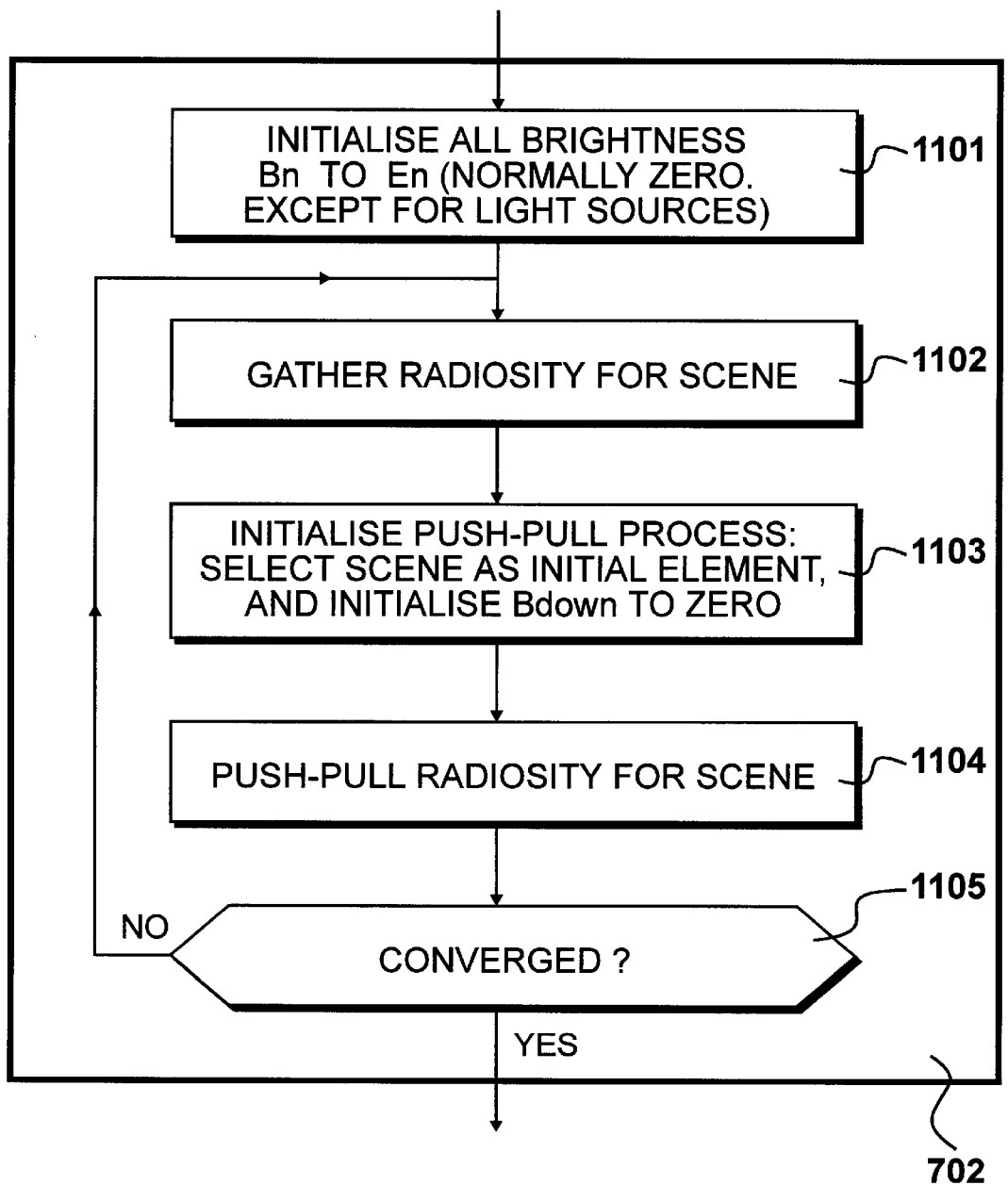
FIG. 11 details a solution for the process of solving the radiosity equation shown in FIG. 7, including a process of gathering the radiosity for the scene, and a process of push-pull radiosity for the scene.

Procedure 702 for the solving of the radiosity equation is detailed in FIG. 11. Each element and object in the scene has an illumination value, and it is the purpose of the radiosity equation to determine an illumination value Bi for all n elements within the scene. The illumination values will be made up from self emissions from the elements or objects themselves, which will be zero except for light sources, in combination with contributions from other elements to which links have been constructed of the form indicated in FIG. 10.

At step 1101 all illumination values for all of the elements Bn are initialised to be equal to their self emission values En which, with the exception of the light sources, will be zero.

At step 1102 illumination contributions for the scene are gathered. For each element, incoming contributions, defined by incoming links, are summed to provide an initial illumination value. These illumination values are not complete in that incoming links occur at different levels. Thus, referring to FIG. 10, element 402 receives a contribution from element 1001 via link 1007. In addition, its sub-elements 1017 to 1020 also receive contributions from element 1014 etc such that, the gathering process identified at step 1102 will result in values being accumulated at element 402 and for example, values being gathered at element 1020. However, in reality, element 1020 represents a portion of element 402 and the illumination of element 402 should be equal to the area average of the illumination values of its subelements 1017 to 1020.

In order to determine accurate values for the elements, taking account of contributions made at different mesh elements levels, a push-pull radiosity procedure is performed at step 1104. In order to initiate this procedure a variable Bdown is set to zero at step 1103.

After completing the push-pull radiosity operation for the first time, processes 1102, 1103 and 1104 are repeated, such that a first iteration may be compared against a second iteration to determine the extent to which estimated illumination values are converging to a stable solution. If the difference between results of these iterations is still considered to be too large, thereby indicating that convergence has not taken place, the question to this effect is answered in the negative at step 1105, and a further iteration of steps 1102 to 1104 is repeated. The question at step 1105 is asked again and ultimately sufficient convergence should take place such that the question asked at step 1105 is answered in the affirmative. Typically eight to twelve repetitions of these steps may be required in order to reach a suitably stable set of illumination values, although this number is highly dependent upon the scene data.

Figure 12:
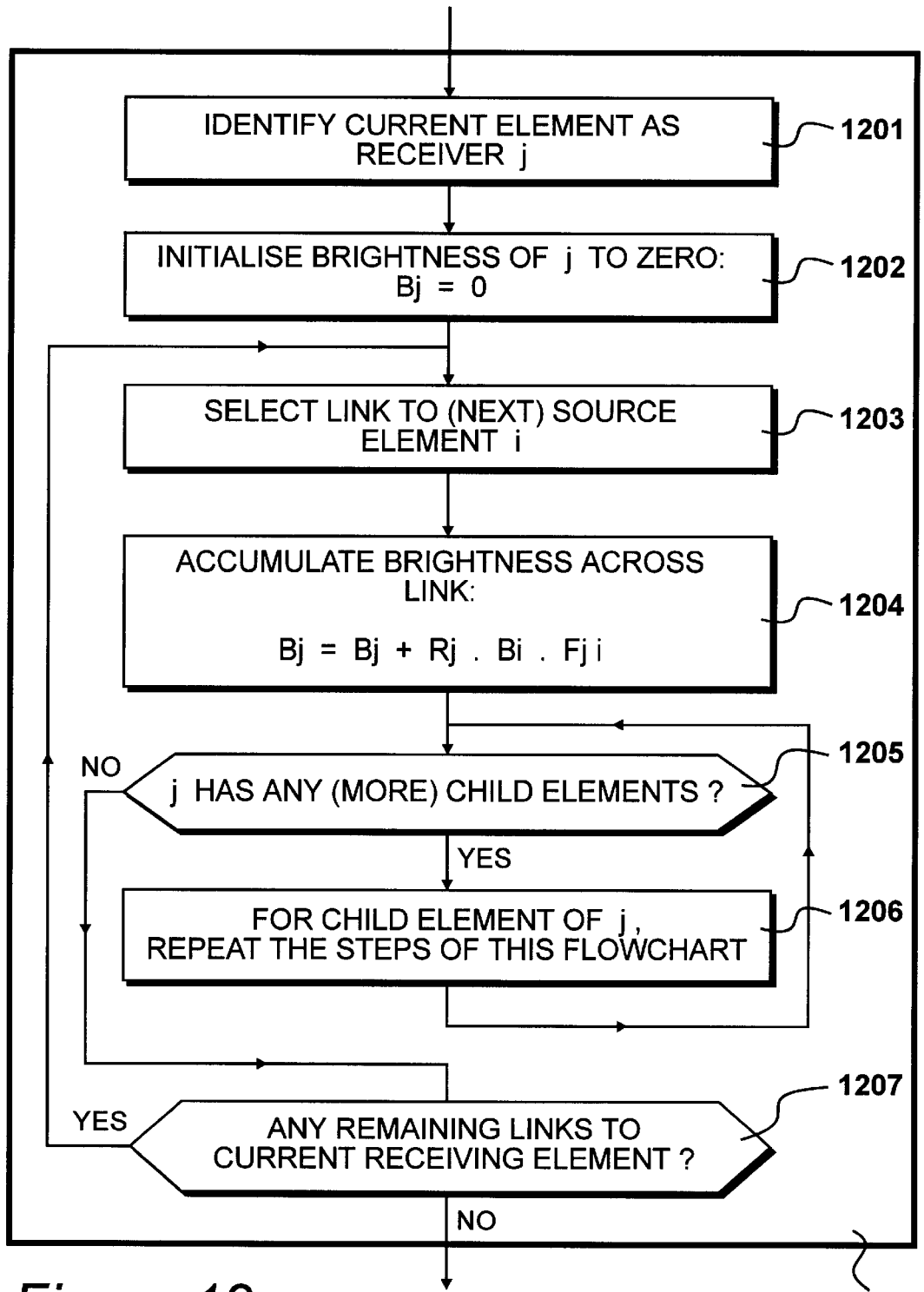
FIG. 12 details the process of gathering the radiosity for the scene shown in FIG. 11.

A method for step 1102, gathering radiosity for the scene, shown in FIG. 11, is detailed in FIG. 12. At step 1201 a current element is identified as a receiver j and at step 1202 the illumination of j is initialised to zero.

A loop is initiated at step 1203 where the next link to a source element, identified as element i, is selected. At step 1204 the illumination across the link from element i to element j is accumulated and at step 1205 the question is asked to whether element j has any more child or subelements to be considered. If this question is answered in the affirmative, the whole procedure 1102 is recursively called at step 1206. This repeats until all of the sub-elements have been considered, whereafter at step 1207 a question is asked as to whether any remaining links to the current receiving element are present. When answered in the affirmative, control is returned to step 1203 and the next link to the receiving element j is selected.

Figure 13:
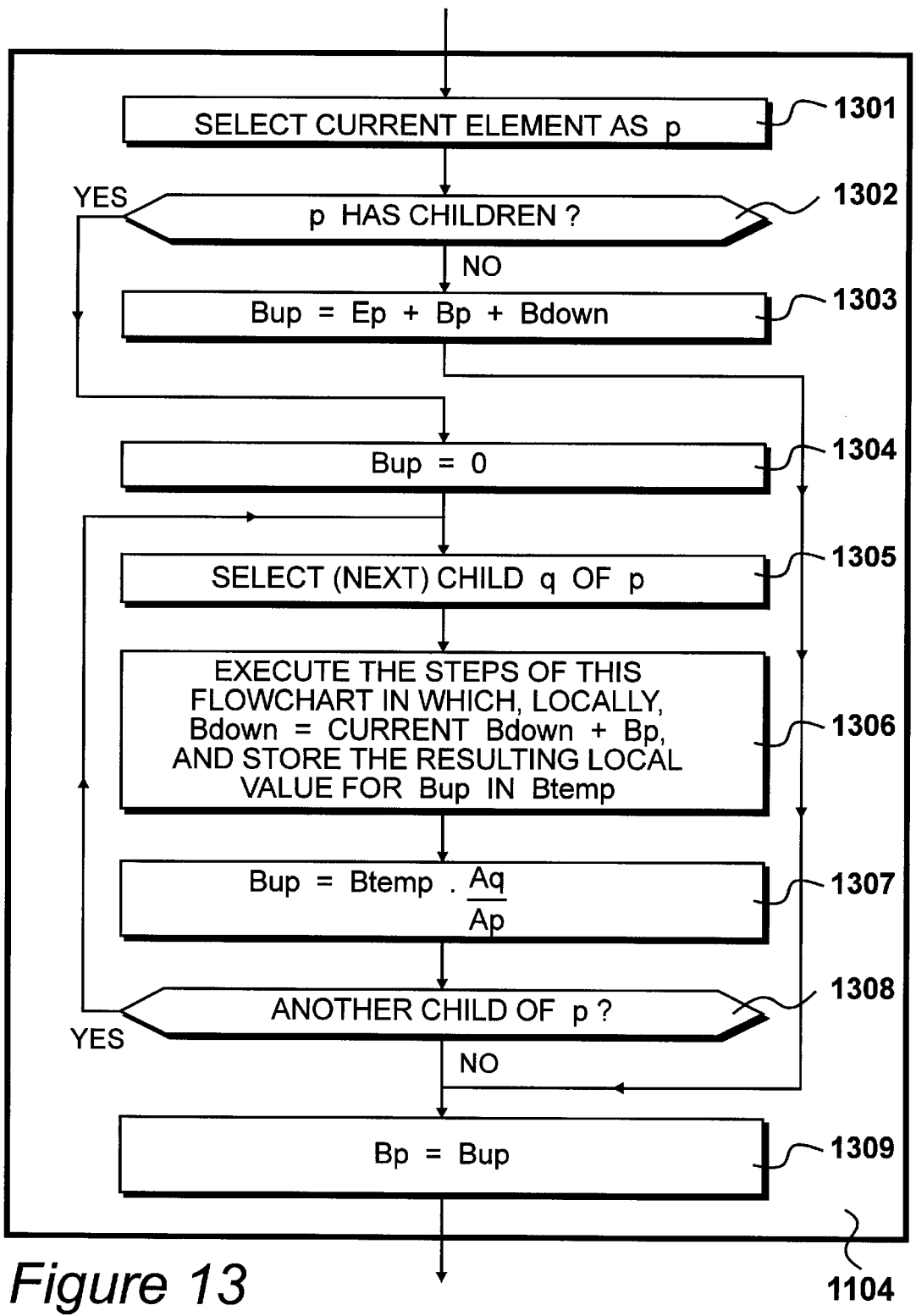
FIG. 13 details the process of push-pull radiosity for the scene shown in FIG. 11.

The push-pull process, indicated at step 1103 in FIG. 11, for the illumination in the scene is detailed in FIG. 13. At step 1301 the current element is considered as p and on the first loop the current element will be that of the highest level of the structure shown in FIG. 10 which, in this example, would be the whole scene represented by cluster 1003. At step 1302 a question is asked as to whether p, selected at step 1301, has child elements and when answered in the affirmative control is directed to step 1304. At step 1304 a variable Bup is set equal to zero, whereafter at step 1305 a next child q of selected element p is selected.

Thereafter, the whole of the procedure shown in FIG. 3 is recursively executed at step 1306. Within the execution of the recursive step, a local value for Bdown is set equal to the current value for Bdown plus Bp, that is the illumination gathered directly at the parent element p. The result, in terms of a local value for Bup is stored in variable Btemp. Thereafter, control is directed to step 1307.

At step 1307 variable Bup is set equal to value Btemp, the local value determined by the recursive call to procedure 1306 which is then multiplied by the area of the child divided by the area of the parent to compute an area average.

At step 1308 a question is asked as to whether another child of p is present and, when answered in the affirmative, control is directed back to step 1305. When all of the children have been considered, the question asked at step 1308 will be answered in the negative and control is directed to step 1309, resulting in a new value for Bp being set equal to Bup. When the question asked at step 1302 is answered in the negative, to the effect that the current element p does not have any children, Bup is set equal to Ep, the self emission value for element p, plus Bp plus Bdown, and control is directed to step 1309.

In an alternative embodiment, the steps shown in FIG. 7 are performed iteratively, as part of a loop. The purpose of this is to facilitate a more accurate determination of error values, upon which decisions are made about the level of meshing that is to be performed. In the iterative process, during the first pass of the steps shown in FIG. 7, at step 701, the multi-resolution representation is constructed for a first error tolerance, eps__1, and then at step 702, the radiosity equation is solved to yield a first solution. On the next iteration, the error tolerance is reduced, to eps__2. However, the multi-resolution representation constructed at step 701 in the previous iteration is already valid down to the eps__1 level of error tolerance. Thus, to continue to the reduced level of error tolerance, given as eps__2, the preexisting multi-resolution representation can be continued by further addition of mesh elements and establishing links, and there is no wastage in having to recalculate existing data structures. A third and additional iterations may then be performed.

A first purpose of this multi-pass method is to enable a rough display of the radiosity solution to be previewed more quickly than if the fully detailed solution is created in one stage. It is possible, then, for an operator to identify obvious deficiencies at an early stage. A further advantage is that the first, or early solutions, provide subsequent solutions with information about the magnitude of light transferred across links, and not just the magnitude of the form factor. This information can be used to improve the accuracy by which errors are predicted, such that even pairs of surfaces with large form factors do not need to be respectively meshed, if the actual light that would be transferred across those links is insignificant. This form of iterative refinement is known as BF refinement.

As a result of completing the solution of the radiosity equation, identified in step 702, brightness values will have been generated for each of the mesh elements at the smallest scale of resolution to which the hierarchy is extended. Thus, at 607, shown in FIG. 6, each of the variously sized mesh elements will have been assigned a respective brightness value. To be precise, the brightness value referred to here is units of radiant flux per unit area per unit solid angle. Thus, at any given moment in time any point across a uniformly lit element will be considered as having the same constant brightness value. Thus, with reference to 607 shown in FIG. 6, if the walls are rendered by displaying the brightness values assigned to each element directly, value discontinuities will be seen at the boundaries between elements.

Figure 14:
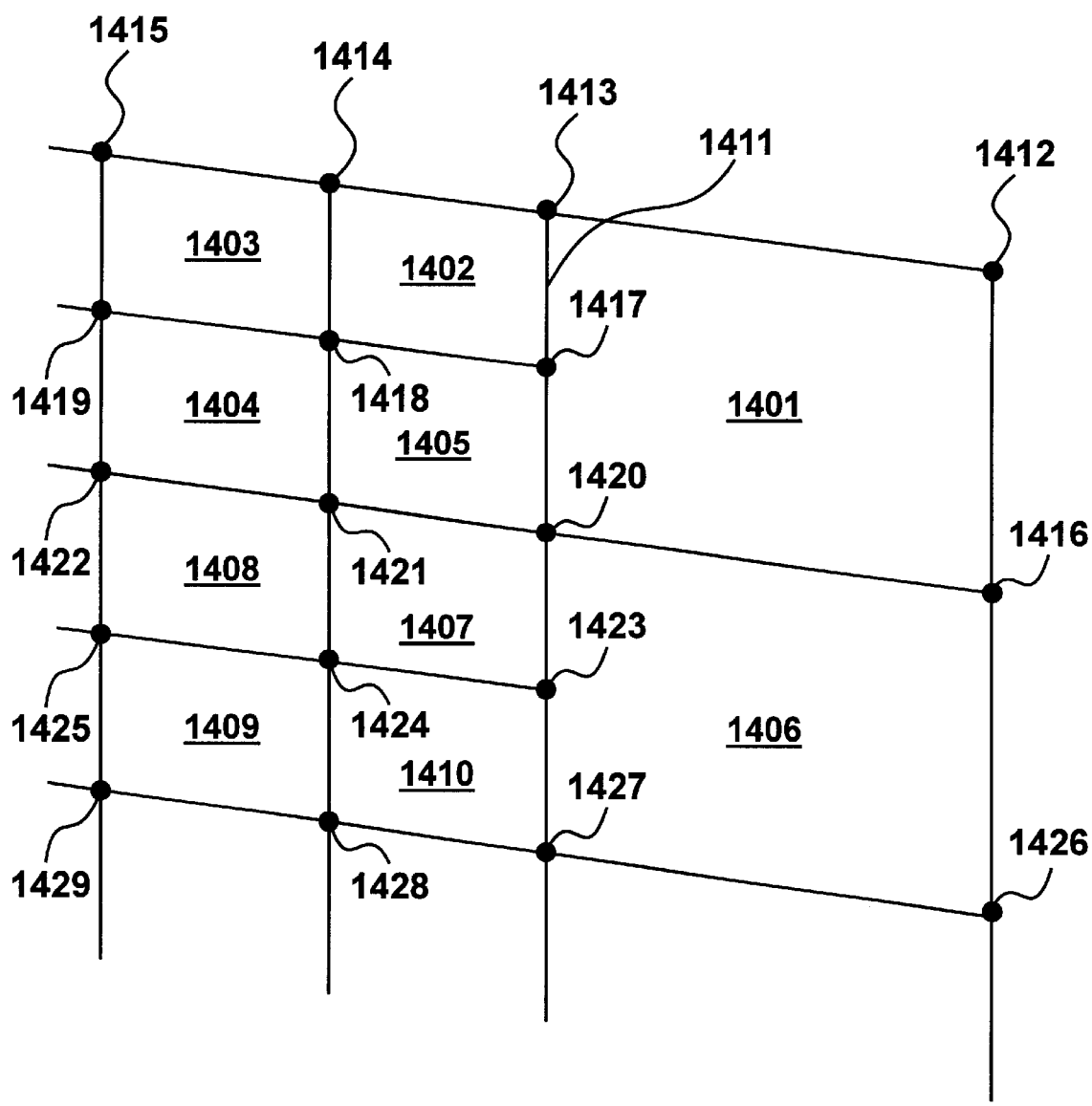
FIG. 14 details vertices for which brightness values will be obtained with reference to hierarchically refined mesh elements.

A subsection of the hierarchically meshed wall shown in FIG. 6 is detailed in FIG. 14. Mesh elements having different brightness values are indicated at 1401 to 1410. Each mesh element has uniform brightness, resulting in discontinuities at the borders between neighbouring mesh elements. Thus, at the border 1411 between mesh element 1401 and mesh element 1402, a discontinuity in brightness occurs, due to the difference in brightness between these two uniformly bright mesh elements. Similarly, discontinuities exist between all mesh elements having different brightness values. In the art, it is known to identify vertices of elements, as indicated at 1412 to 1429. Brightness values at the points represented by vertices 1412 to 1429 may be approximated using interpolation techniques. Once brightness values for the vertices 1412 to 1429 have been established, vertex brightness values may be supplied to a graphics rendering engine, such as that provided within the processor structure indicated at FIG. 2, identified at 210.

The graphics engine 210 is able to consider brightness values at points, and to perform bi-linear interpolation in order to provide a smooth brightness gradient across each of the mesh elements 1401 to 1410. This is known as Gouraud shading. Thus, methods are known for determining continuous brightness gradients for images rendered from uniform mesh element brightness values. However, it is desirable for the radiosity method to enable highly non-linear variations in lighting, such as those encountered in a natural environment, to be reproduced with a high degree of realism. Thus, the step of determining brightness values for vertices 1412 to 1429 from the uniform brightness values established for mesh elements 1401 to 1410, is important.

The brightness value of a vertex, for example vertex 1420, may be determined from its four neighbouring mesh elements 1401, 1405, 1407 and 1406, to a reasonable level of accuracy. This accuracy diminishes in proportion to the brightness gradient. However, a greater source of error is the process of Gouraud shading itself, that uses vertex values as a source of input data, from which to determine an area of continuously changing brightness. Gouraud shading performs a simple bilinear interpolation between mesh element vertices. Thus, the changing gradient of brightness across a meshed region is not taken into account. The human visual system is extremely sensitive to discontinuities in brightness gradient, resulting in highly visible mesh element boundaries in regions that are subject to complex light shading patterns. It is known that storing additional information about brightness gradients, and using this information to reconstruct smoothly changing brightness gradients, avoids obvious visual artefacts that results from Gouraud shading. However, this method requires additional data storage and additional processing during radiosity simulation and radiosity rendering.

The graphics engine 210, shown in FIG. 2, in addition to having the ability to efficiently render a piecewise linear brightness gradient across surfaces from vertex values, is further capable of supporting a rendering technique known as texture mapping. In texture mapping, an array of pixels, or bitmap, representing the surface of an object, is supplied to the graphics engine 210. Transformation instructions are associated with the bitmap, such that the bits of the bitmap are stretched, rotated and distorted as necessary in order to fit the surface of the object that is being rendered. As a view is changed, only the transformation instructions need to be updated. By using a texture map of radiosity values, many mesh elements may be replaced. Thus, instead of performing transformations upon a large number of mesh elements, and then performing Gouraud shading upon each of them, transformations, at each displayed frame, may be applied to a smaller number of radiosity texture-mapped polygons, resulting in a reduction in the amount of bandwidth and processing operations that are required when rendering.

For example, a texture map may be generated for a wall 401 shown in FIG. 4. Furthermore, a texture map may be created for curved objects, such as the base of the statue 405, where a mapping function is able to project a flat two-dimensional texture map onto the curved surface of the cylindrical shape of the statue base 405.

Texture mapping, as described above, has been established as a valuable method for increasing the efficiency of rendering radiosity-generated brightness data for surfaces within three-dimensional scenes. However, the step of generating a smooth brightness gradient from mesh elements of uniform brightness remains a problem. To reduce processing to a reasonable level, most radiosity implementations must make the assumption that elements have a uniform brightness, and a precise evaluation of vertex brightnesses from uniform brightness mesh elements cannot be made without considerable computational penalty.

The process of replacing radiosity meshing with radiosity textures 703, shown in FIG. 7, is an improved process that overcomes the problem of identifying vertex brightness values, and also provides an improved method for the creation of texture maps from a radiosity mesh.

At step 1501 of FIG. 15 the next surface is identified for radiosity texture mapping. For each object in the scene, a texture map may be generated. Each object has a hierarchically meshed surface, from which brightness information will be used in order to determine the texture map for that surface. At step 1502 a texture map is constructed. In each hierarchically meshed object surface, the mesh will typically extend to several hierarchical layers, each of which represents a different level of mesh resolution. This is indicated at 607 in FIG. 6, where a pair of walls has been hierarchically meshed to varying degrees.

If one of these walls is identified as an object for which a texture map is to be generated at step 1501, step 1502 identifies the finest level of mesh resolution encountered upon the surface of the walled object. The left most wall indicated at 607 in FIG. 6, comprises a finest level of mesh resolution identified by a mesh of size 608. At step 1502 a texture map is constructed having an area equal to that of the area of the wall, but whose pixel resolution is uniform throughout, and which is equal to the finest level of resolution of the mesh elements, indicated at 608. Furthermore, the original corners of each mesh element map onto a single pixel that is shared by each adjacent mesh element. This results in a mesh density of x by y mesh elements being represented by a texture map, created at step 1503, by x+1 by y+1 pixels. This initial texture map includes unwanted brightness artefacts if Gouraud shaded.

At step 1503, the texture map generated at step 1502 is increased in resolution by a process of bilinear interpolation. Thus, for an original mesh density of x by y elements, an increased resolution texture map is generated, having 2x by 2y pixels. The process of bilinear interpolation ensures that new pixels added between element boundaries have intermediate brightness values. However, brightness discontinuities may still be apparent. The process of bilinear interpolation is performed in order to ensure that the process of increasing the resolution of the texture map does not result in an unnecessary increase in unwanted artefacts.

At step 1504 the high resolution texture map generated at step 1503 is filtered using a low pass Gaussian filter. In the preferred embodiment, fourth order Gaussian filtering is used. After performing this secondary filtering process, the resulting texture map has smooth brightness gradients that are suitable for being rendered in a photo-realistic image.

A problem may be encountered at this stage of the procedure, in that a large amount of memory may be required in order to store the smoothed texture map, with the inherited advantages of the filtering process outweighed by the amount of memory that is used to store the high quality results. In an image comprising many objects, and hence many surfaces, care must be taken in order to ensure that memory requirements do not exceed those of the computer system available, whose restrictions are defined by the size of the memory 203 shown in FIG. 2.

At step 1505 a question is asked as to whether the texture map generated at step 1503, and filtered at step 1504 uses too much memory. If a texture map does use too much memory, control is directed to step 1506. At step 1506 the texture map is used to determine vertex values, such as those identified at 1412 to 1429 in FIG. 14. Thus, the advantages of the high quality filtering of the texture map are retained, and are represented as vertex values without the excessive memory resources that may be required for storing a texture map for the surface of every object. The vertex values may be determined easily, as each vertex of the original radiosity mesh corresponds directly to an individual pixel. At step 1507, these vertex brightness values are stored for later use during rendering.

When rendering is to be performed, as indicated at step 305 in FIG. 3, the graphics engine 210 receives vertex brightness values determined at step 1506, and uses Gouraud shading in order to perform a highly efficient reconstruction of the smooth brightness gradient represented by the texture map that was created at step 1504, but without the need to receive an excessively large amount of bitmap data.

If, at step 1505, the texture map is determined not to use too much memory, control is directed to step 1508, where the texture map is stored for later use in shading operations during rendering. At step 1509, a question is asked as to whether another object's surface is to be texture mapped and, if answered in the affirmative, control is directed to step 1501; otherwise this completes the process of converting a radiosity mesh into a radiosity texture identified at 703 shown in FIG. 7.

The invention comprises steps for generating texture maps for the surfaces of objects, in which element brightness discontinuities are smoothed by increasing a resolution of the surface, and performing a filtering operation upon data representing brightness values for that surface. Furthermore, brightness values for the vertices at the corners of a mesh element may be determined with reference to a texture map constructed from mesh element brightnesses, as an alternative to storing texture map data.

Figure 15A:
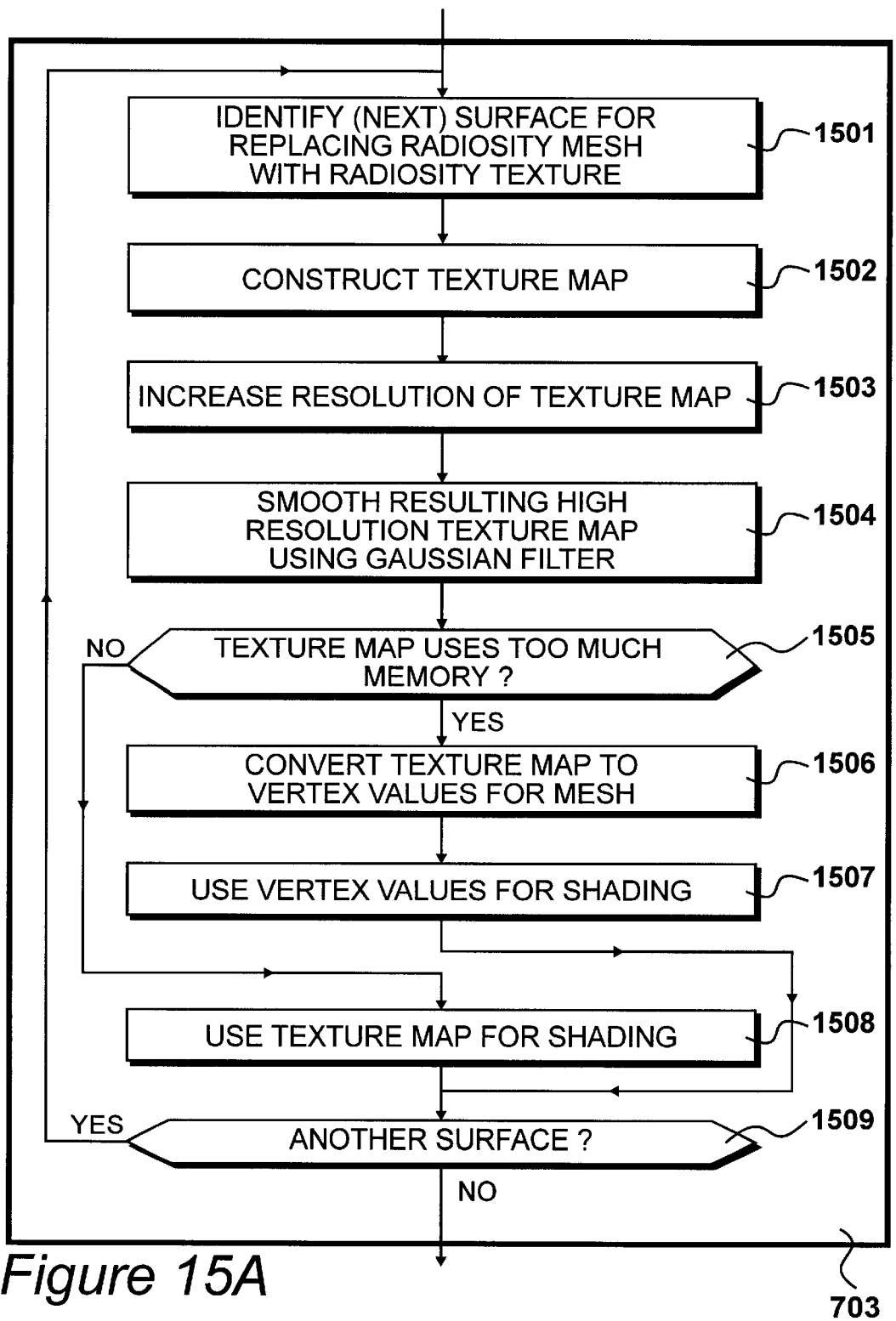
FIG. 15A details the process for replacing radiosity meshing with radiosity textures shown in FIG. 7, including a step of identifying a surface for replacement with a radiosity texture, a step for constructing a texture map, and steps for generating radiosity textures.
Figure 15B:
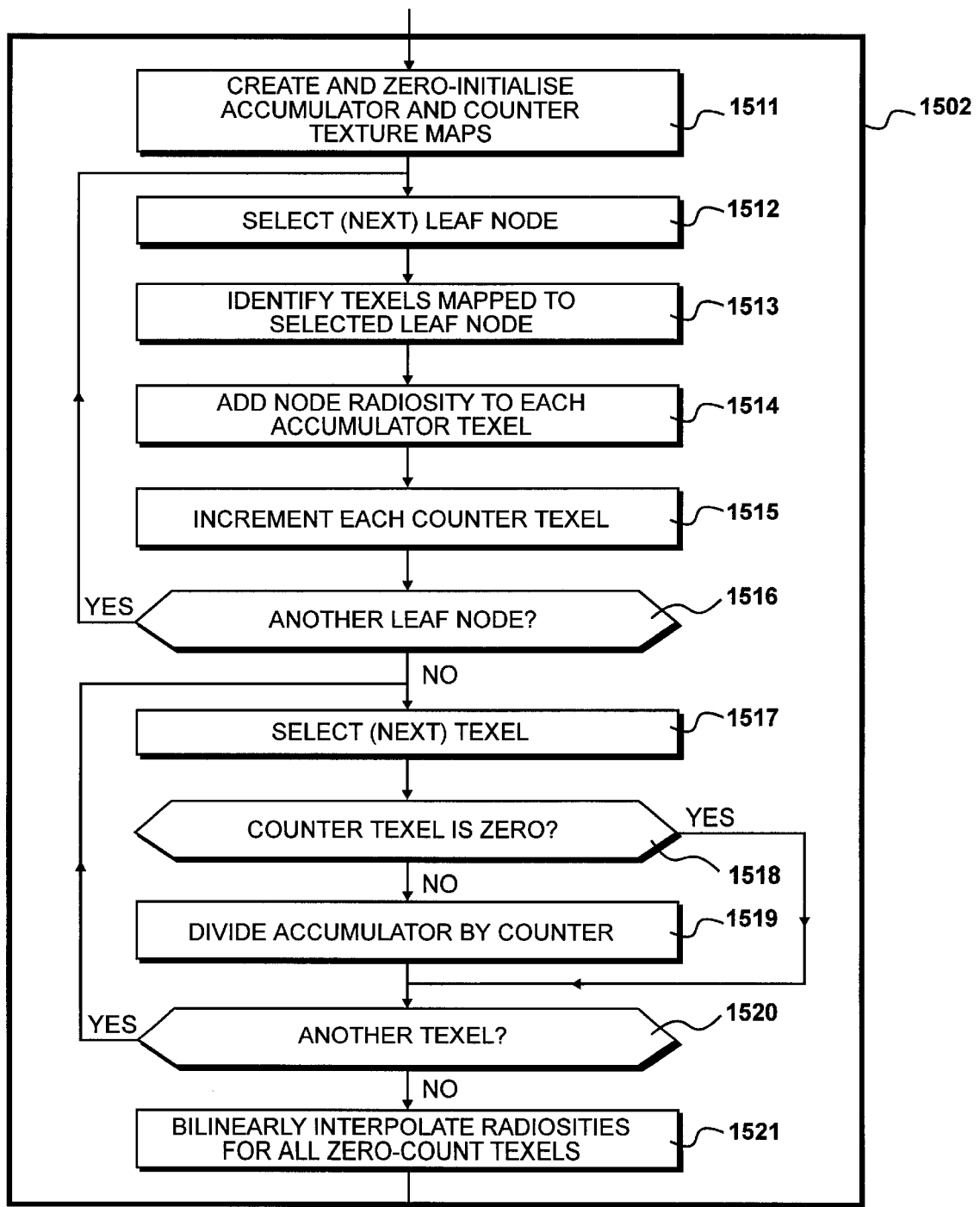
FIG. 15B details the step of constructing the texture map shown in FIG. 15A.

The step of constructing a texture map, indicated at 1502 in FIG. 15A, is detailed in FIG. 15B. At step 1511 an accumulator texture map and a counter texture map are created. These texture maps are two-dimensional arrays of texture pixels, also known as texels. The dimensions of these texture maps are determined by the highest resolution of the radiosity mesh for which a texture map is to be created. The radiosity mesh is therefore considered as having a uniform resolution equal to the highest resolution represented within it. These texture maps are then constructed, having a corresponding number of texels, plus one, in each dimension, such that vertices of the radiosity mesh coincide with the centres of texels.

The radiosity mesh is considered at its leaf nodes, representing the highest resolution subdivision for each part of the surface represented. A first leaf node of the radiosity mesh is selected at step 1512. Texels mapped to this leaf node are identified at step 1513. The mapping function identifies four texels at the corners of an individual mesh element corresponding to the leaf node. In an alternative embodiment, mesh elements are not restricted to being rectangular in shape, and may be triangular, or an alternative configuration. In this situation, a mapping of nodes appropriate to the geometry of the mesh is selected.

At step 1514 the radiosity for the node is added to the four identified accumulator texels. At step 1515 each associated counter texel is incremented. At step 1516, a question is asked as to whether another leaf node is available for selection. If answered in the positive, control is directed back to step 1512, and steps 1512 to 1516 are repeated. Alternatively, control is directed to step 1517.

Once the loop of steps 1512 to 1516 has been completed, texel values at the corners of all radiosity mesh elements will have been identified and accumulated. The next stage of the process, represented by steps 1517 to 1520, performs a process of dividing the accumulated radiosity values by the number of mesh elements that contributed to those values. At step 1517, the first texel in the accumulator texture map is selected. At step 1518, a question is asked as to whether the associated counter texel is zero. If so, no radiosity contributions have been made to this texel, and a division by zero is avoided by jumping to step 1520. At step 1519, the texel contents are known to be valid, and the accumulated radiosity is divided by the counter. For convenience, the result is stored in the accumulator texel. At step 1520, a question is asked as to whether another texel remains for consideration. If so, control is directed back to step 1517. Alternatively, control is directed to step 1521. The result is that texels represent radiosity at vertex elements computed as the average of radiosity elements sharing each particular vertex.

Once all of the accumulated radiosity values have been divided in this way, many texels will remain that have not received radiosity contributions, since they were not mapped directly to any of the leaf nodes. These texels can be recognised because their counter values remain at zero. For each of these texels, a radiosity value is derived by performing bilinear interpolation between texels having known radiosity values. As a result of completing step 1521, the accumulator texels contain a rough approximation to a smooth texture map for the original radiosity mesh selected for conversion to radiosity textures. Thereafter, control continues at step 1503 shown in FIG. 15A.

Figure 16:
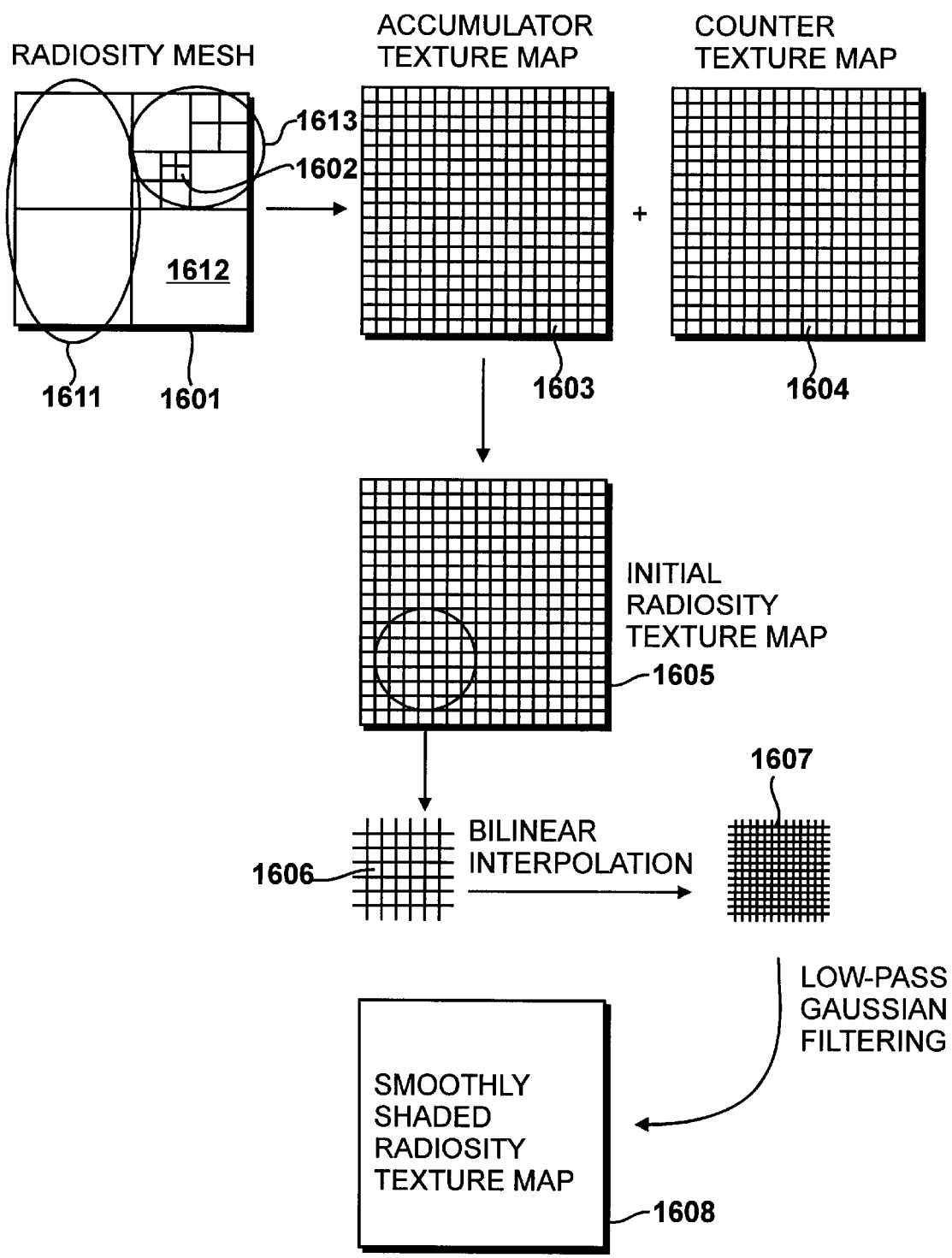
FIG. 16 illustrates texture maps generated according to the steps shown in FIG. 15A and FIG. 15B.

The result of executing the steps shown in FIG. 15A and 15B is shown graphically in FIG. 16. At 1601, a hierarchically meshed surface is indicated, comprising mesh elements of various sizes. These include an area which has been meshed to the highest level of resolution for the surface of the object, as shown at 1602.

An accumulator texture map 1603 and a counter texture map 1604 are generated and used in accordance with the steps shown in FIG. 15B. This results in an initial radiosity texture map 1605 being created, which provides a first approximation to smooth radiosity surface variation. The resolution of the initial radiosity texture map 1605, represented at 1606, is doubled by a process of bilinear interpolation, resulting in a high resolution radiosity texture map. This is then low-pass filtered to generate the final smoothed radiosity as texture, as indicated at 1608.

As can be seen from FIG. 16, it is possible for a very high resolution bitmap to be generated for a surface that may only contain a relatively small region of high resolution mesh elements. Thus, for area 1611, the level of pixel resolution for the bitmap as a whole is relatively inefficient. Nevertheless, in order for the filtering process to operate, it is necessary to ensure that the area with the high level of resolution 1602 is represented to the highest level of detail that will be encountered.

Figure 17:
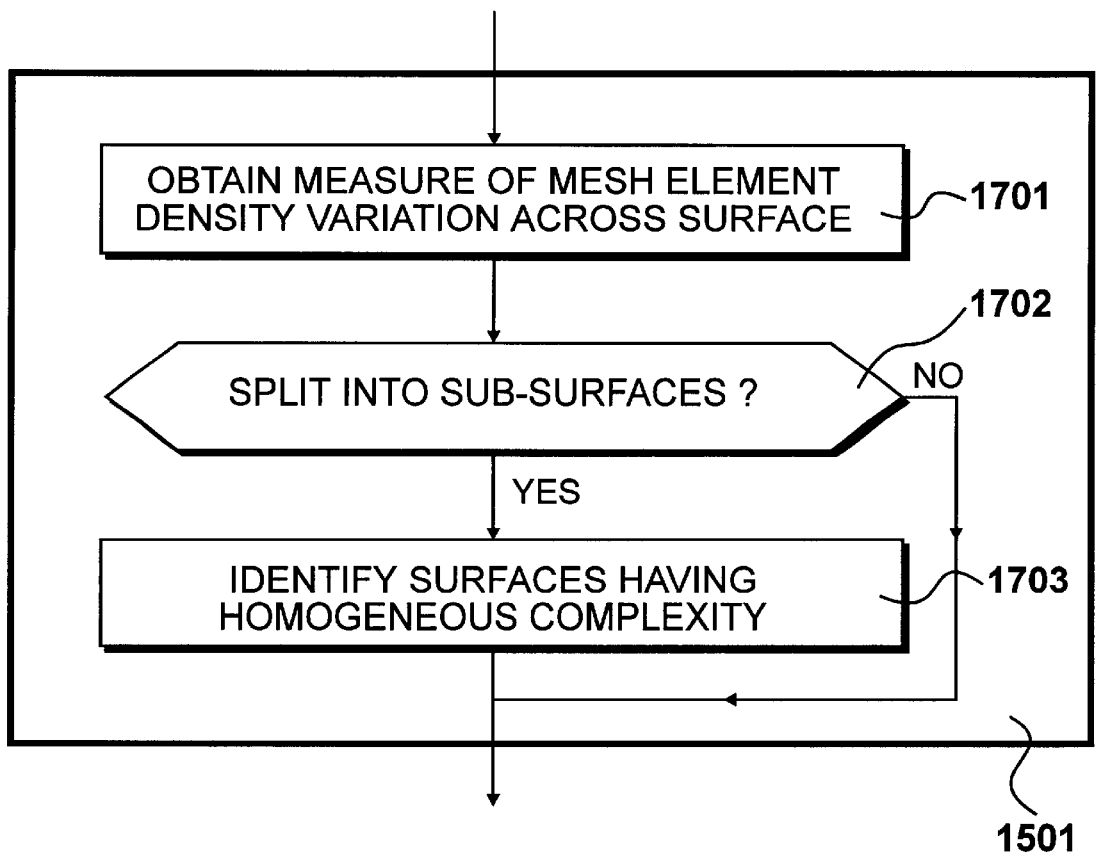
FIG. 17 details the step of identifying a surface for replacement with a radiosity texture shown in FIG. 15A.

At step 1501, where a surface is identified for texture mapping, account is taken for the variation of mesh element density across the surface of each object. Step 1501 is detailed in FIG. 17. At step 1701 a measure is made of the mesh element density variation across the surface of the object. At step 1702 a question is asked as to whether the surface of the object should be split into sub-surfaces. This evaluation is made upon the data obtained from the measurement made in step 1701. If considered appropriate, the surface may be considered as sub-surfaces, having substantially homogeneous complexity, as indicated at step 1703, so that radiosity textures can be generated having appropriate levels of resolution, and excessive memory usage avoided.

Figure 18:
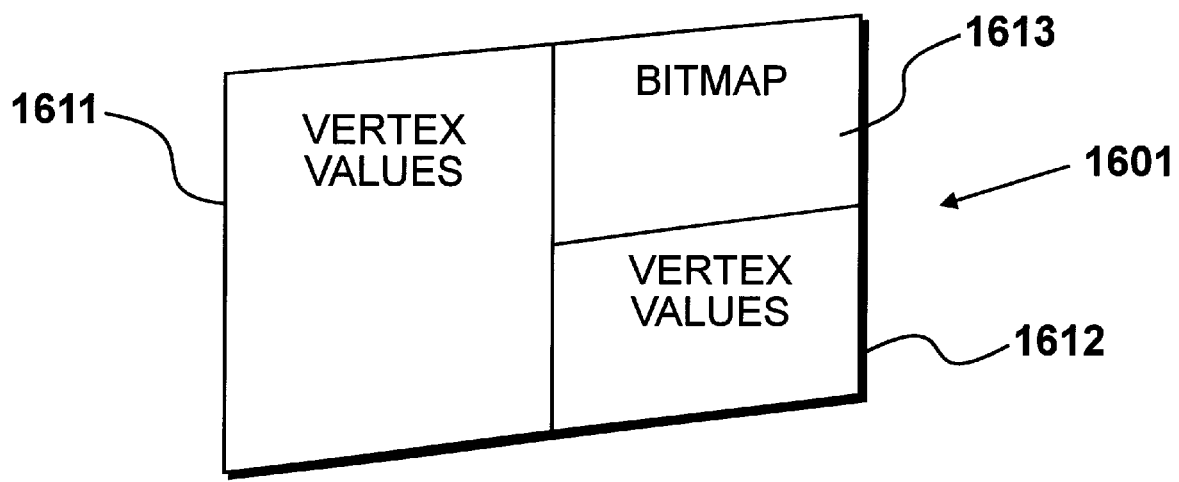
FIG. 18 indicates a result of having executed the steps shown in FIG. 17 and the steps shown in FIG. 15A.

This completes the process of identifying the next surface for texture mapping shown at step 1501. For each of the surfaces identified in step 1501, the remaining steps 1502 to 1509 are executed with respect to each identified surface. This results in the object's surface 1601 being split up into three areas, which are illustrated in FIG. 18. Areas 1611 and 1612 are filtered using the new texture map filtering method, but are further translated into vertex brightness values in order to reduce the amount of memory required. Area 1613, however, is stored as a bitmap due to the high level resolution encountered in that area of the object's surface. Areas 1611 and 1612, having brightness values stored at vertices, are rendered with high efficiency because a large surface area is represented by a small amount of defining data, which may then be translated by the graphics engine 210 into a smoothly changing brightness gradient. For an area 1613 of greater complexity, the bitmap includes high resolution data which may be supplied to the graphics engine 210, again with a high degree of efficiency, given the highly complex nature of the brightness gradients that are to be rendered for that portion of the surface of the object.

Thus, by making the choice to split into sub-surfaces, identified at step 1702, and furthermore to determine whether each of these individual sub-surfaces is to be texture mapped or translated back into vertex representations of brightness, a form of data compression results, reducing the bandwidth of data that must be transferred between a processor 201 or 202 through the switch 209 to the graphics engine 210. As is known, processors 210 and 212 execute mathematical instructions with a high degree of efficiency, but performance is impaired when having to communicate with peripheral devices or memory. By identifying surface brightnesses with reference to a smaller data structure, that arises from use of the invention, processor efficiency is increased. The resulting increase in processing performance is of substantial value at step 305 shown in FIG. 3, when the vertex values and texture maps are rendered into projections of the three-dimensional scene onto a two-dimensional image plane. This increase in performance is extremely useful in situations where real-time rendering of the three-dimensional scene is to be achieved. In these situations a typical frame rate of twenty-five or thirty frames per second is required.

An example of a real-time application for the present invention is a virtual studio. In a virtual studio, the artificial scene shown in FIG. 4 may be combined with images from a real studio, such that artificial objects, walls and studio features may be superimposed upon the real studio in which minimal features are present. The combination of real and artificial images in this way results in the creation of a virtual set, in which real and virtual objects may be mixed.

Figure 19:
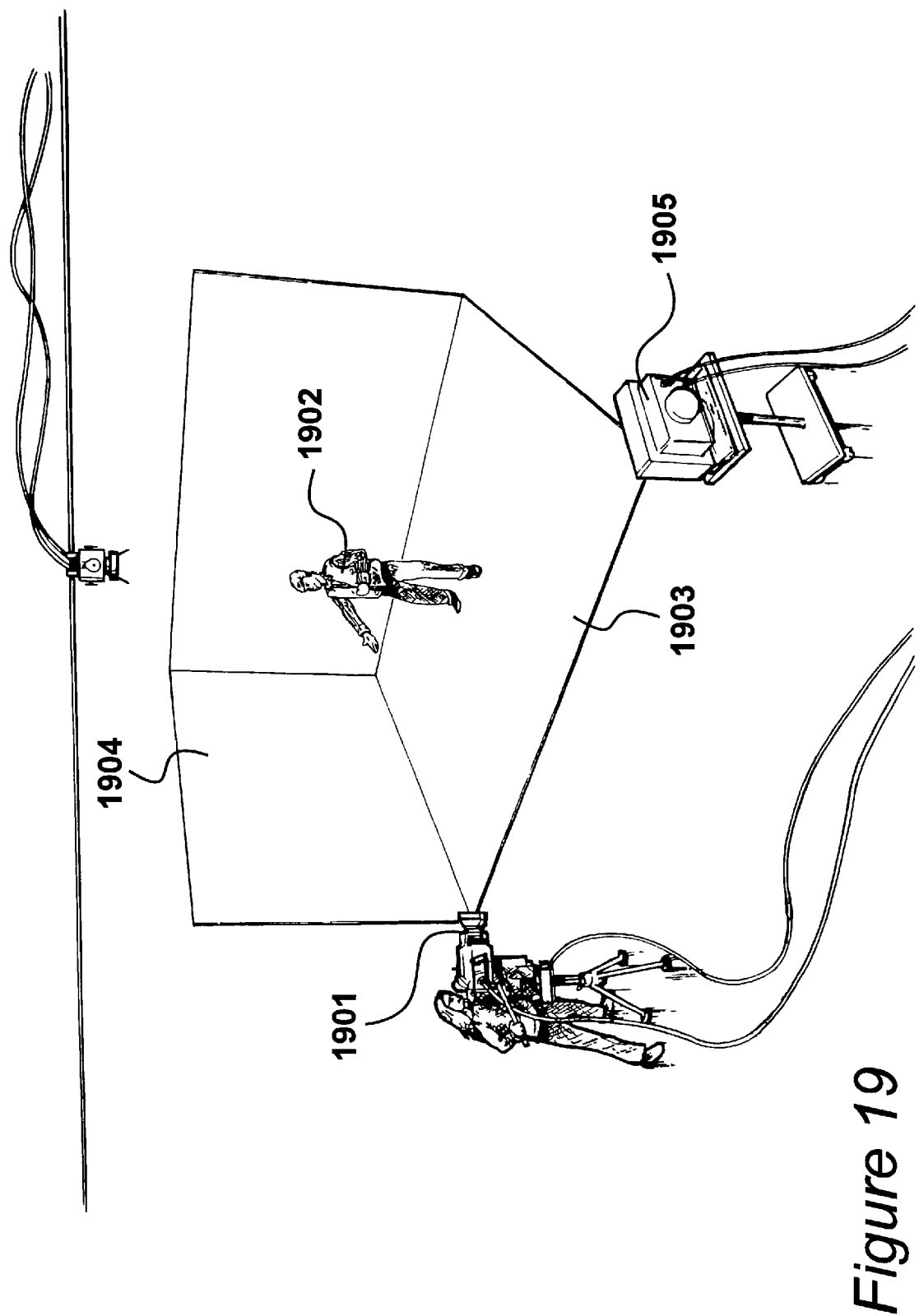
FIG. 19 illustrates a virtual set.

An example of a virtual set is shown in FIG. 19. A camera 1901 generates live video image data, as well as serial positional data and lens data. The camera is aimed at talent 1902, located in the centre of a blue screen environment, comprising a blue screen floor 1903 and walls 1904. The blue colour of the walls is carefully controlled and calibrated in such a way so as to facilitate automatic replacement of any blue areas of the subsequently processed camera images with a corresponding virtual image. A monitor 1905 facilitates visual feedback for the talent 1902, such that it is possible to interact in a subsequently processed camera image, with a corresponding virtual image. The monitor 1905 facilitates visual feedback for the talent, such that it is possible to interact in a more natural way with objects in the virtual world.

Figure 20:
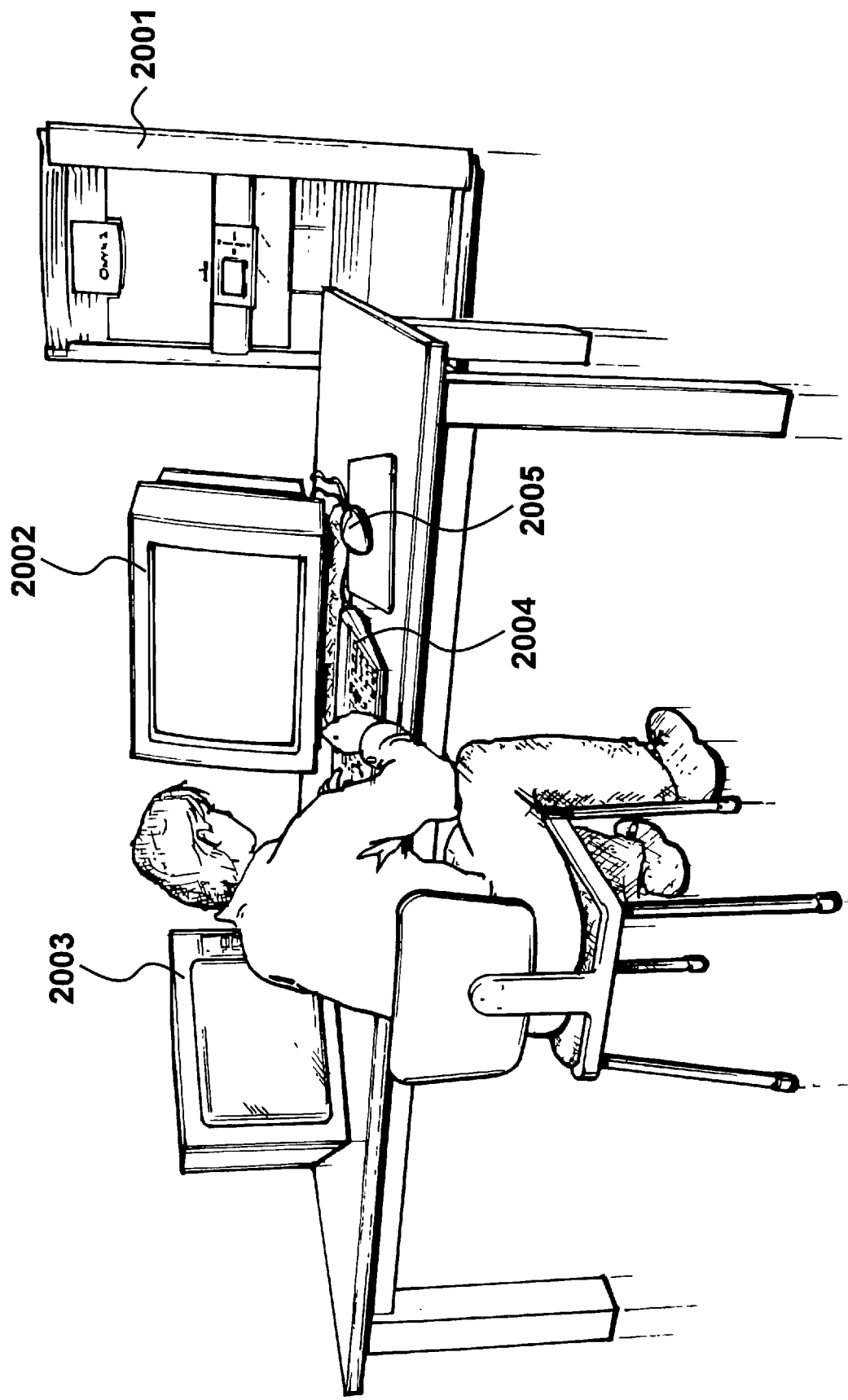
FIG. 20 illustrates equipment required in order to combine data from the virtual set shown in FIG. 19 and the virtual scene shown in FIG. 4.

Equipment for composing image data from the virtual set shown in FIG. 19 with artificial scene images such as the one shown in FIG. 4, is detailed in FIG. 20. A main processor 2001, such as an Onyx2™, manufactured by Silicon Graphics Inc, receives image and position data signals from the camera 1901 shown in FIG. 19. The position information from the camera 1901, together with lens data, including zoom and focus enable a calculation to be performed of the viewpoint of the camera with respect to the virtual set. The walls of the virtual set are calibrated at positions, so that at least one of either the floor or the two walls may be used as a reference plane that will match with a corresponding floor or wall plane in the artificial scene shown in FIG. 4. Commands for controlling the virtual environment are performed by the operator using a mouse 2005, a keyboard 2004 and a monitor 2002. A high quality broadcast monitor 2003 is also provided on which to view the results of the compositing process.

The operator has control over such parameters as blue screen removal, floor plane or wall plane tolerance mapping and quality control, ensuring that calibrations are maintained. The main processor 2201 renders the scene shown in FIG. 4 in accordance with the radiosity simulation process described previously. Once this step has been performed, it then becomes possible to render the scene from any viewpoint. In a virtual set the viewpoint is defined by the camera position and the lens condition. Thus, the main processor 2001 performs radiosity rendering in response to signals from the camera 1901. The rendered scene is then keyed with the real video data using a blue screen keyer process, such that the talent 1902 appears to be in a highly realistic scene, comprising the objects shown in FIG. 4.

What we claim is:

1. A method of shading a surface generated from a radiosity simulation, in which said surface has been divided into a plurality of elements, and a brightness value has been calculated for each of said elements, including the steps of defining an initial surface shading in which the resolution of shading is determined in response to the highest element density of said surface;

processing element brightness values to generate brightness values for said initial surface shading; and filtering values of said initial surface shading to generate brightness values for an enhanced surface shading.

2. A method according to claim 1, wherein the resolution of said initial surface shading is equal to the density of one texture pixel (texel) per element vertex at the region of greatest element density within said surface generated from the radiosity simulation.

3. A method according to claim 1, wherein said step of processing element brightness values includes combining the brightness of a plurality of elements to generate a single texel brightness value in said initial surface shading.

4. A method according to claim 1 wherein said step of filtering includes the steps of increasing the resolution of said initial surface shading; and filtering said increased resolution shading.

5. A method according to claim 4 wherein said step of increasing the resolution of said initial surface shading includes interpolating brightness values.

6. A method according to claim 4 wherein said step of filtering includes a process of Gaussian filtering.

7. A method according to claim 1, including the additional step of generating element vertex brightness values from said enhanced surface shading.

8. A method of shading surfaces generated from a radiosity simulation, in which surfaces have been divided into a plurality of elements, and a brightness value has been calculated for each of said elements, including the steps of defining an initial surface shading in which the resolution of shading is determined in response to the highest element density of said surface;

processing element brightness values to generate brightness values for said initial surface shading;

filtering values of said initial surface shading to generate brightness values for an enhanced surface shading; and in response to surface data storage requirements, selectively storing said enhanced surface shading, or vertex data derived from said enhanced surface shading.

9. A method according to claim 8, wherein said enhanced surface shading has a substantially higher resolution than said initial surface shading.

10. A method of rendering surface data in which a signals are supplied from a virtual set, including camera view signals and camera image signals, including steps of rendering a first surface area from a radiosity texture;

rendering a second surface area from radiosity vertex values derived from an intermediate radiosity texture; wherein said radiosity textures have been generated by the steps of defining an initial surface shading in which the resolution of shading is determined in response to the highest element density of said surface;

processing element brightness values to generate brightness values for said initial surface shading; and filtering values of said initial surface shading to generate brightness values for an enhanced surface shading.

11. Apparatus for shading a surface generated from a radiosity simulation, including processing means and storage means including a storage area for instructions for said processing means, in which said surface has been divided into a plurality of elements, and a brightness value has been calculated for each of said elements, wherein said processing means is configurable to perform the steps of defining an initial surface shading in which the resolution of shading is determined in response to the highest element density of said surface;

processing element brightness values to generate brightness values for said initial surface shading; and filtering values of said initial surface shading to generate brightness values for an enhanced surface shading.

12. Apparatus according to claim 11, wherein the resolution of said initial surface shading is equal to the density of one texel per element vertex at the region of greatest element density within said surface generated from the radiosity simulation.

13. Apparatus according to claim 11, wherein said step of processing element brightness values includes combining the brightness of a plurality of elements to generate a single texel brightness value in said initial surface shading.

14. Apparatus according to claim 11 wherein said step of filtering includes the steps of increasing the resolution of said initial surface shading; and filtering said increased resolution shading.

15. Apparatus according to claim 14 wherein said step of increasing the resolution of said initial surface shading includes interpolating between brightness values.

16. Apparatus according to claim 14 wherein said step of filtering said increased resolution shading is performed by a process of Gaussian filtering.

17. Apparatus according to claim 11, including the additional step of generating element vertex brightness values from said enhanced surface shading.

18. Apparatus for shading surfaces generated from a radiosity simulation, including processing means and storage means including a storage area for instructions for said processing means, in which a surface has been divided into a plurality of elements, and a brightness value has been calculated for each of said elements, wherein said processing means is configurable to perform the steps of defining an initial surface shading in which the resolution of shading is determined in response to the highest element density of said surface;

processing element brightness values to generate brightness values for said initial surface shading;

filtering values of said initial surface shading to generate brightness values for an enhanced surface shading; and in response to surface data storage requirements, selectively storing said enhanced surface shading, or vertex data derived from said enhanced surface shading.

19. Apparatus according to clam 18, wherein said enchanced surface shading has a substantially higher resolution than said initial surface shading.

20. Apparatus for rendering surface data generated from a radiosity simulation, in response to signals from a virtual set, including processing means and storage means including a storage area for instructions for said processing means, in which said surface has been divided into a plurality of elements, and a brightness value has been calculated for each of said elements, wherein said processing means is arranged to receive camera view signals and camera image signals from a virtual set, and is configurable to perform the steps of rendering a first surface area from a radiosity texture;

rendering a second surface area from radiosity vertex values derived from an intermediate radiosity texture; wherein said radiosity textures have been generated by the steps of defining an initial surface shading in which the resolution of shading is determined in response to the highest element density of said surface;

processing element brightness values to generate brightness values for said initial surface shading; and filtering values of said initial surface shading to generate brightness values for an enhanced surface shading.

21. In a virtual set, in which real foreground images are combined with synthesised background images in real-time, means configured to generate said background image data, comprising apparatus for shading a surface generated from a radiosity simulation, including processing means and storage means including a storage area for instructions for said processing means, in which said surface has been divided into a plurality of elements, and the brightness value has been calculated for each of said elements, wherein said processing means is configurable to perform the steps of defining an initial surface shading in which the resolution of shading is determined in response to the highest element density of said surface;

processing element brightness values to generate brightness values for said initial surface shading; and filtering values of said initial surface shading to generate brightness values for an enhanced surface shading.

22. Apparatus according to claim 21, wherein the resolution of said initial surface shading is equal to the density of one texel per element vertex at the region of greatest element density within said surface generated from the radiosity simulation.

23. Apparatus according to claim 21, wherein said step of processing element brightness values includes combining the brightness of a plurality of elements to generate a single texel brightness value in said initial surface shading.

24. Apparatus according to claim 21, wherein said step of filtering includes the steps of increasing the resolution of said initial surface shading; and filtering said increased resolution.

25. Apparatus according to claim 24, wherein said step of filtering said increased resolution shading is performed by a process of Gaussian filtering.

26. A computer-readable medium having computer-readable instructions executable by a computer such that said computer performs the steps of:

shading a surface generated from a radiosity simulation, in which said surface has been divided into a plurality of elements, and a brightness value has been calculated for each of said elements, including the steps of defining an initial surface shading in which the resolution of shading is determined in response to the highest element density of said surface;

processing element brightness values to generate brightness values for said initial surface shading; and filtering values of said initial surface shading to generate brightness values for an enhanced surface shading.

27. A computer-readable medium according to claim 26, wherein said instructions are executed by said computer, such that the resolution of said initial surface shading is equal to the density of one texel per element vertex at the region of greatest element density within said surface generated from the radiosity simulation.

28. A computer-readable medium according to claim 26, wherein said instructions are executed by said computer such that said step of processing element brightness values includes combining the brightness of a plurality of elements to generate a single texel brightness value in said initial surface shading.

29. A computer-readable medium according to claim 26, wherein said instructions are executed by said computer such that said step of filtering includes the steps of increasing the resolution of said initial surface shading; and filtering said increased resolution shading.

30. A computer-readable medium according to claim 29, wherein said instructions are executed by said computer such that said step of increasing the resolution of said initial surface shading includes interpolating brightness values.

31. A computer-readable medium according to claim 29, wherein said instructions are executed by said computer such that said step of filtering includes a process of Gaussian filtering.

32. A computer-readable medium according to claim 26, wherein said instructions are executed by said computer to perform the additional step of generating element vertex brightness values from said enhanced surface shading.

* * * * *

UNITED STATES PATENT AND TRADEMARK OFFICE
CERTIFICATE OF CORRECTION

PATENT NO. : 6,487,322 B1
DATED : November 26, 2002
INVENTOR(S) : Rui Bastos and Filippo Tampieri It is certified that error appears in the above-identified patent and that said Letters Patent is hereby corrected as shown below:

<u>Title page,</u>
Item [56], References Cited, U.S. PATENT DOCUMENTS, insert
-- 5,481,275  01/1996  Mical et al. 345/698 --

Signed and Sealed this

Twenty-ninth Day of July, 2003

JAMES E. ROGAN
*Director of the United States Patent and Trademark Office*